US011677710B2

(12) United States Patent
Perry

(10) Patent No.: US 11,677,710 B2
(45) Date of Patent: *Jun. 13, 2023

(54) SYSTEMS AND METHODS FOR RECOMMENDING MERCHANT DISCUSSION GROUPS

(71) Applicant: SHOPIFY INC., Ottawa (CA)

(72) Inventor: Michael Leander Perry, Oakland, CA (US)

(73) Assignee: SHOPIFY INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,506

(22) Filed: Sep. 20, 2021

(65) Prior Publication Data
US 2022/0006770 A1 Jan. 6, 2022

Related U.S. Application Data

(63) Continuation of application No. 16/447,087, filed on Jun. 20, 2019, now Pat. No. 11,153,256.

(51) Int. Cl.
*H04L 51/234* (2022.01)
*H04L 51/52* (2022.01)
(Continued)

(52) U.S. Cl.
CPC ......... *H04L 51/52* (2022.05); *G06Q 30/0601* (2013.01); *H04L 51/234* (2022.05); *H04L 51/00* (2013.01)

(58) Field of Classification Search
CPC ....... H04L 51/52; H04L 51/00; H04L 51/224; H04L 51/51; H04L 51/234; G06Q 30/2601; G06Q 30/06
(Continued)

(56) References Cited

U.S. PATENT DOCUMENTS 5,715,466 A * 2/1998 Flanagan ............... G06F 40/58
704/8
6,609,106 B1 * 8/2003 Robertson .......... G06Q 30/0236
705/26.8
(Continued)

FOREIGN PATENT DOCUMENTS

CN 102044009 A 10/2009
CN 103888792 A 6/2014
(Continued)

OTHER PUBLICATIONS

Extended European Search Report and Search Opinion issued on European Patent Application No. 20180370, dated Jul. 30, 2020, 9 pages.
(Continued)

*Primary Examiner* — Khanh Q Dinh

(57) ABSTRACT

Systems and methods are disclosed in which merchants on an e-commerce platform may use a same computer application to start and/or join discussion groups with other merchants on the e-commerce platform. An existing discussion group may be recommended to a merchant based on data specific to that merchant. A notification of the recommendation may be transmitted to the user interface of the merchant's device, and if the merchant accepts the recommendation, then the discussion group may be added to the set of discussion groups the merchant follows. Alternatively, a recommended discussion group may be automatically added to the set of discussion groups the merchant follows.

19 Claims, 14 Drawing Sheets

(51) Int. Cl.
*G06Q 30/0601* (2023.01)
*H04L 51/00* (2022.01)

(58) Field of Classification Search
USPC .................. 709/220, 224, 225, 226, 228
See application file for complete search history.

(56) References Cited

U.S. PATENT DOCUMENTS

| | | | |
|---|---|---|---|
| 8,346,626 B2* | 1/2013 | Robertson | G06Q 30/0601 |
| | | | 705/26.8 |
| 9,129,329 B2* | 9/2015 | Robertson | G06Q 30/0633 |
| 9,195,753 B1 | 11/2015 | King et al. | |
| 10,142,276 B2 | 11/2018 | Rapaport et al. | |
| 10,402,058 B2 | 9/2019 | Wang | |
| 10,469,215 B2 | 11/2019 | Rakib et al. | |
| 10,469,275 B1* | 11/2019 | Broomall | H04L 51/52 |
| 11,153,256 B2* | 10/2021 | Perry | H04L 51/234 |
| 2001/0029455 A1* | 10/2001 | Chin | G06F 40/58 |
| | | | 704/277 |
| 2005/0033650 A1* | 2/2005 | Robertson | G06Q 30/02 |
| | | | 705/26.8 |
| 2006/0149637 A1 | 7/2006 | Zellner et al. | |
| 2006/0282426 A1 | 12/2006 | Spears | |
| 2009/0063991 A1 | 3/2009 | Baron et al. | |
| 2012/0101985 A1 | 4/2012 | Kemp et al. | |
| 2013/0311906 A1* | 11/2013 | Mackin | H04L 51/52 |
| | | | 709/204 |
| 2013/0346329 A1 | 12/2013 | Mib-Bulatao et al. | |
| 2014/0067826 A1 | 3/2014 | Jackson et al. | |
| 2014/0074629 A1 | 3/2014 | Rathod | |
| 2014/0098275 A1 | 4/2014 | Kawaguchi et al. | |
| 2014/0200968 A1 | 7/2014 | Yoder et al. | |
| 2015/0134547 A1* | 5/2015 | Oikonomidis | G06F 16/9554 |
| | | | 705/306 |
| 2016/0019627 A1 | 1/2016 | Musil et al. | |
| 2016/0042438 A1* | 2/2016 | Robertson | G06Q 30/0633 |
| | | | 705/26.8 |
| 2016/0086108 A1 | 3/2016 | Abelow | |
| 2018/0032222 A1 | 2/2018 | Wang | |
| 2018/0324135 A1 | 11/2018 | Bastide et al. | |
| 2018/0324136 A1 | 11/2018 | Bastide et al. | |
| 2019/0020606 A1 | 1/2019 | Vasudeva et al. | |
| 2019/0130496 A1 | 5/2019 | Aroli Veettil et al. | |
| 2019/0215294 A1 | 7/2019 | Bastide et al. | |
| 2019/0215295 A1 | 7/2019 | Bastide et al. | |
| 2019/0294644 A1 | 9/2019 | Chasse et al. | |
| 2019/0327259 A1 | 10/2019 | DeFelice | |
| 2020/0098286 A1 | 3/2020 | Chen et al. | |
| 2020/0402118 A1 | 12/2020 | Perry | |
| 2020/0403954 A1 | 12/2020 | Perry | |

FOREIGN PATENT DOCUMENTS

| | | |
|---|---|---|
| CN | 105869012 A | 3/2016 |
| CN | 106663266 A | 5/2017 |
| CN | 107317688 A | 7/2017 |
| WO | 02097678 A1 | 12/2002 |

OTHER PUBLICATIONS

Zhigang Lu and Hong Mu, "A group-recommend based P2P E-commerce trust model," 2008 IEEE International Conference on Service Operations and Logistics, and Informatics, 2008, pp. 677-679, doi: 10.1109/SOLI.2008.4686483.

* cited by examiner

E-Commerce Platform | Search | JG John's Apparel / Jonny B. Good

- Home
- Orders
- Products
- Costumers
- Reports
- Discounts
- Apps

SALES CHANNELS
- Online Store
- Mobile App

View all channels

Settings

Good afternoon, Jonny B..
Here's what's happening with your store today.

Today's total sales   Today's visits
$98.00                1

● Update your Platform Payments tax details
We require additional information to verify your identity.
[Update tax details]

● Advanced Cash on Delivery has been deactivated for your store
[See why]

All channels ⌄    Today ⌄

TOTAL SALES
$98.00

$125
$75
$25
        12am    4pm  8pm  11pm

Jun 1
2 orders

TOTAL SALES BY CHANNEL    View dashboard

Online Store                     Jun 1
$0.00                            0 orders Mobile app
$0.00                            0 orders Shopify POS (126 York St.)
$0.00                            0 orders

FIG. 2

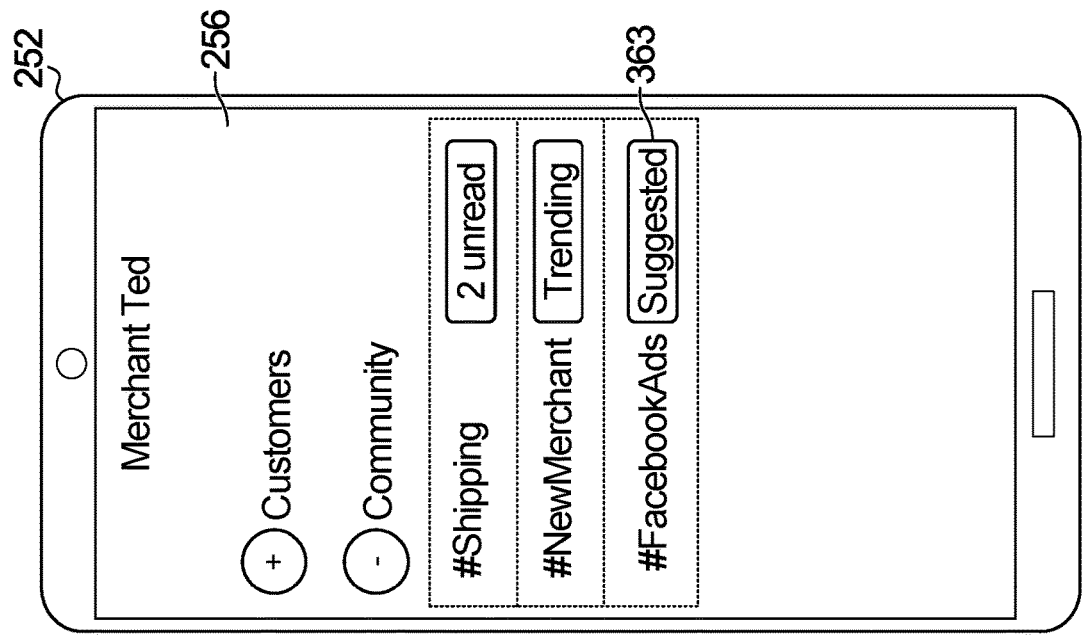
Example 2
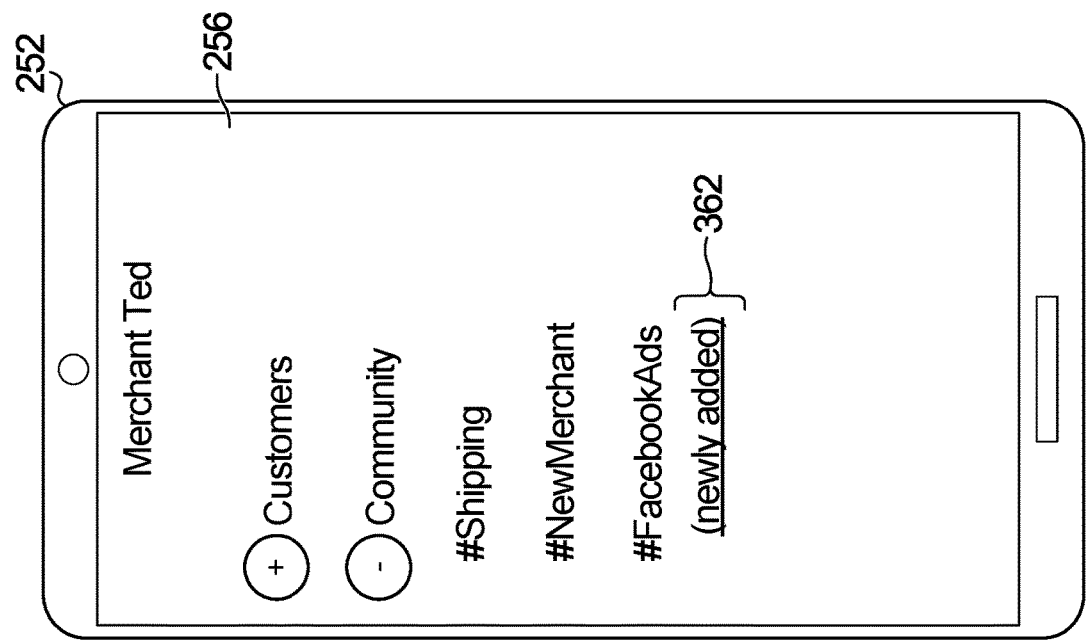
Example 1
FIG. 8

502

| Settings | Associated Discussion Groups |
| --- | --- |
| ⋮ | ⋮ |
| Facebook Channel = YES | #FacebookAds<br>#FacebookHacks<br>⋮ |
| Instagram Channel = YES | #InstagramQ&A<br>#NewToInstagram<br>⋮ |
| DiscountApplied = YES | #WhenToRemoveDiscount<br>#LeveragingDiscounts<br>⋮ |
| Location = New York | #NYMerchants<br>#EastCoastMerchants<br>⋮ |
| Location = Boston | #BostonMerchants<br>#EastCoastMerchants<br>⋮ |
| ⋮ | ⋮ |

FIG. 13

SYSTEMS AND METHODS FOR RECOMMENDING MERCHANT DISCUSSION GROUPS

RELATED APPLICATION

This application is a continuation of U.S. patent application Ser. No. 16/447,087, entitled "Systems and Methods for Recommending Merchant Discussion Groups Based on Settings in an E-commerce Platform", which was filed on Jun. 20, 2019, the contents of which are incorporated by reference in their entirety.

FIELD

The present application relates to a computer application for use by merchants in an e-commerce platform.

BACKGROUND

A merchant may use an e-commerce platform to sell goods and/or services to customers. The number of merchants that use an e-commerce platform may be large, and these merchants may be geographically dispersed. A merchant may feel isolated and lacking the ability to communicate with other merchants.

Therefore, some merchants have tried to use computer technology, such as the Internet, to converse with other merchants. For example, a merchant may start or join a discussion group on a social media platform, e.g. a merchant may start a Facebook™ group that other merchants may join. Merchants may use the discussion group to share information and experiences. Examples of discussion groups include forums, message boards, and chat rooms.

SUMMARY

In some embodiments, systems and methods are disclosed in which merchants on an e-commerce platform may use a same computer application to start and/or join discussion groups with other merchants on the e-commerce platform. The computer application may be part of or associated with the e-commerce platform.

In some embodiments, systems and methods are disclosed in which an existing discussion group is recommended to a merchant based on data specific to that merchant. A notification of the recommendation may be transmitted to the user interface of the merchant's device, and if the merchant accepts the recommendation, then the discussion group may be added to the set of discussion groups the merchant follows. Alternatively, a recommended discussion group may be automatically added to the set of discussion groups the merchant follows.

Examples of data specific to a merchant include: the merchant's development phase, e.g. the state of the merchant's business; and/or the merchant's settings in the e-commerce platform; and/or other discussion groups the merchant follows; and/or messages posted by the merchant in other discussion groups; etc.

For each discussion group the merchant follows, the merchant may use the user interface of the merchant's device to read messages posted to the discussion group by other merchants and/or to post messages to the discussion group.

According to one embodiment, there is provided a computer-implemented method. The computer-implemented method may include retrieving data specific to a particular merchant that is stored in an e-commerce platform. The method may further include using the data to categorize the particular merchant as belonging to a particular category of a plurality of merchant categories, where each category of the plurality of merchant categories has associated therewith a respective subset of discussion groups. The method may further include selecting a target discussion group that the particular merchant is not already associated with. The target discussion group is selected from the subset of discussion groups associated with the particular category. The method may further include storing in memory an association between the particular merchant and the target discussion group in order to associate the particular merchant with the target discussion group. A system configured to perform the method may also be provided. For example, the system may include a memory to store information related to a plurality of discussion groups, and a processor to perform some or all of the steps above for the particular merchant.

According to another embodiment, there is provided another computer-implemented method. The computer-implemented method may include obtaining an indication that a particular merchant has a particular setting in an e-commerce platform. The particular setting is one of a plurality of settings in the e-commerce platform, and each setting of the plurality of settings has associated therewith a respective subset of discussion groups. The method may further include selecting a target discussion group that the particular merchant is not already associated with. The target discussion group is selected from the subset of the discussion groups associated with the particular setting. The method may further include storing in memory an association between the particular merchant and the target discussion group in order to associate the particular merchant with the target discussion group. A system configured to perform the method may also be provided. For example, the system may include a memory to store information related to a plurality of discussion groups, and a processor to perform some or all of the steps above for the particular merchant.

BRIEF DESCRIPTION OF THE DRAWINGS

Embodiments will be described, by way of example only, with reference to the accompanying figures wherein:

FIG. 2 is an example of a home page of an administrator, according to one embodiment;

FIGS. 8 and 9 illustrate example user interfaces of a merchant device;

FIG. 13 illustrates an example of look-up-table of a plurality of settings; and

DETAILED DESCRIPTION

For illustrative purposes, specific example embodiments will now be explained in greater detail below in conjunction with the figures.

Example E-Commerce Platform

The embodiments described in the following description are performed on or in association with an e-commerce platform. Therefore, an example of an e-commerce platform will first be described.

Figure 1:
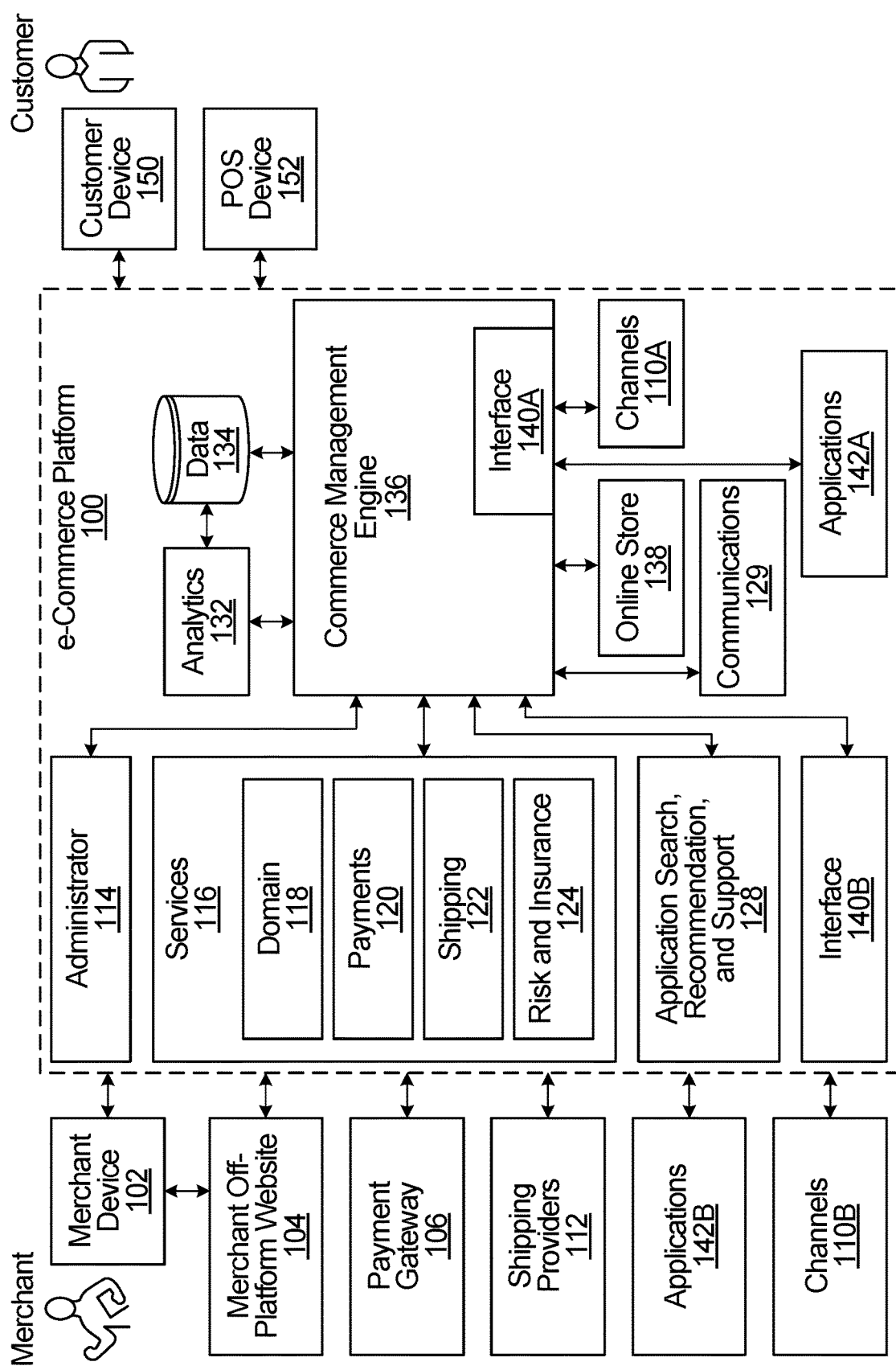
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Communication with Other Merchants on E-Commerce Platform 100

A merchant may use an e-commerce platform, e.g. e-commerce platform 100, to sell goods and/or services to customers. The number of merchants that use an e-commerce platform may be large, and these merchants may be geographically dispersed. A merchant may feel isolated and lacking the ability to communicate with other merchants. Problems arise, such as how does a merchant know where to navigate on the Internet in order to join or start a discussion group with other merchants on an e-commerce platform. For example, not every merchant on an e-commerce platform necessarily uses Facebook™ to start or join a discussion group over a computer network. Some merchants on the e-commerce platform may instead use another social media platform to join or start a discussion group. Another example problem is how does a merchant find discussion groups that are relevant and of interest to the merchant. For example, a merchant who does not ship any physical products, but instead sells downloadable content, would likely not be interested in a discussion group for merchants about shipping, but may be interested in a discussion group for merchants about selling downloadable content.

In view of the above, in some embodiments systems and methods are disclosed in which merchants on an e-commerce platform may use a same computer application to start and/or join discussion groups with other merchants on the e-commerce platform. The computer application may be part of or associated with the e-commerce platform. In some embodiments, systems and methods are disclosed in which an existing discussion group is recommended to a merchant based on data specific to that merchant.

Figure 3:
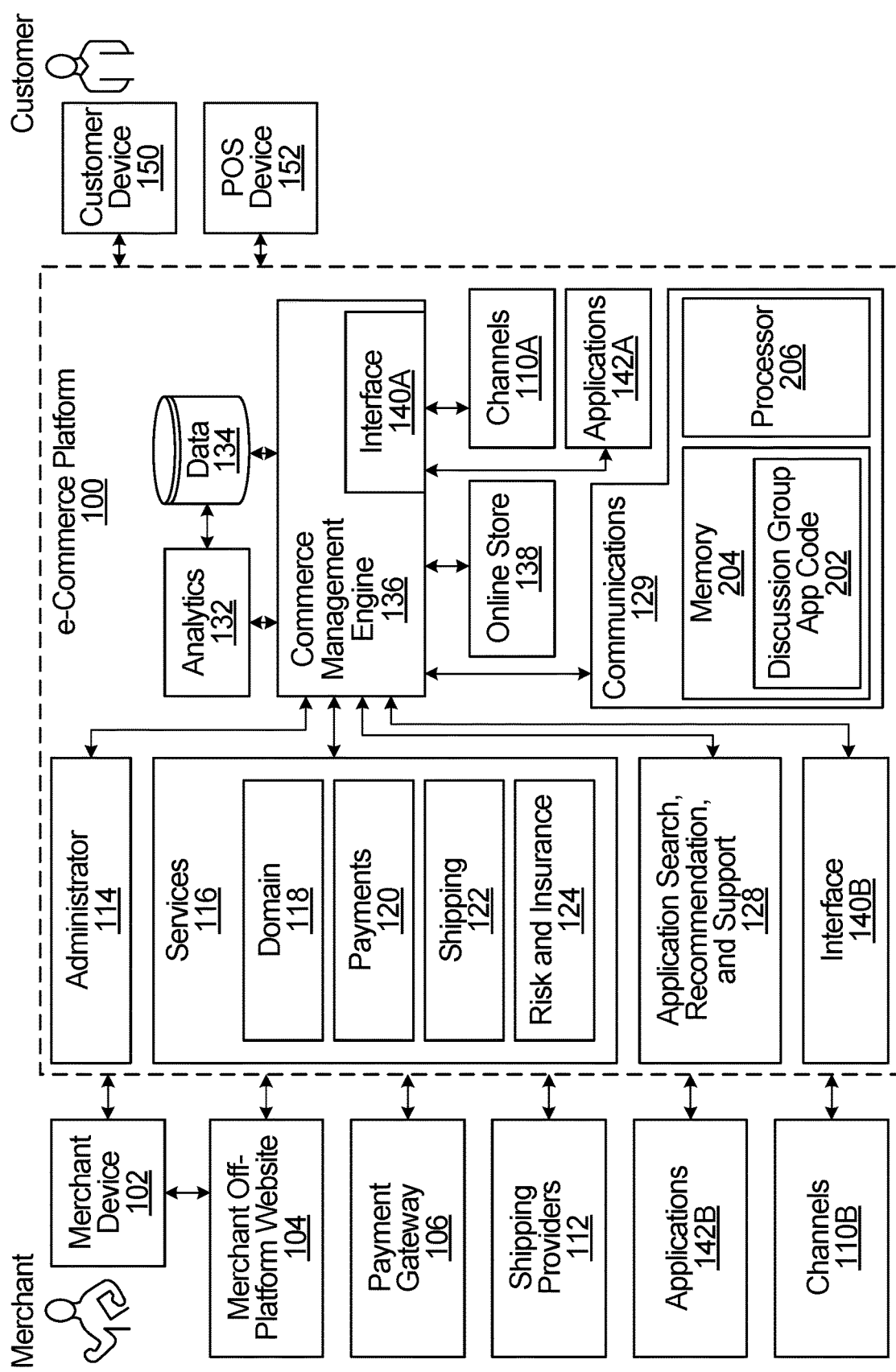
FIG. 3 is a block diagram of an e-commerce platform, according to another embodiment.

For example, e-commerce platform 100 includes a communications facility 129, which may be used to perform functions such as facilitating electronic communication with customers. In some embodiments, the communications facility 129 executes an application that also allows for group discussions between different merchants on the e-commerce platform 100. For example, FIG. 3 illustrates the e-commerce platform 100 of FIG. 1, but including merchant discussion group application code 202 stored in memory 204, and a processor 206. The merchant discussion group application code 202 includes computer-executable instructions that, when executed by the processor 206, cause the processor 206 to implement merchant discussion groups and provide the functionality explained herein, e.g. identifying target merchant discussion groups for a merchant based on merchant-specific data. The merchant discussion group application code 202, when executed, may cause the processor 206 to communicate with other components of the e-commerce platform 100 (e.g. the commerce management engine 136) in order to obtain the merchant-specific data.

However, although the embodiments described below may be implemented in association with e-commerce platform 100, the embodiments described below are not limited to the specific e-commerce platform 100 of FIGS. 1 to 3. Therefore, the embodiments below will be presented more generally in relation to any e-commerce platform.

Merchant Discussion Groups

Figure 4:
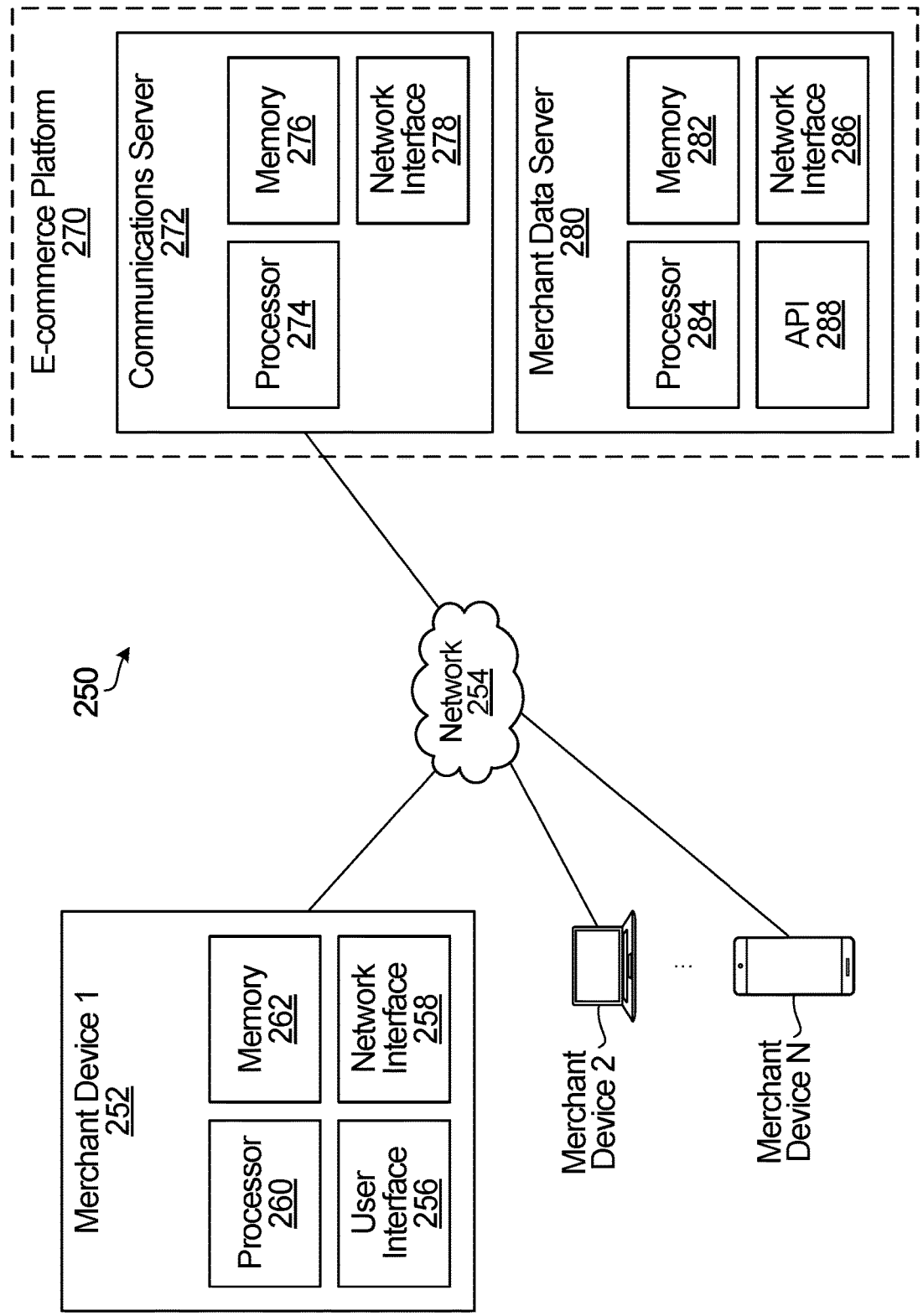
FIG. 4 illustrates a system for facilitating merchant discussion groups, according to one embodiment.

FIG. 4 illustrates a system 250 for facilitating merchant discussion groups, according to one embodiment. The system 250 includes a plurality of different merchant devices, labelled merchant device 1 to merchant device N. In FIG. 4, each merchant device belongs to a respective different merchant, but more generally some merchants may have more than one merchant device. Reference character 252 is used to generically indicate any one merchant device of the plurality of different merchant devices 1 to N. For example, reference character 252 is used to indicate merchant device 1 in FIG. 4, but this is only an example. A merchant device 252 is a device used by a merchant to communicate with other merchants over a network 254. For example, merchant device 252 may be a mobile phone, tablet, laptop, or personal computer owned and/or used by a merchant.

A merchant device 252 includes a user interface 256. An example of a user interface is a display screen (which may be a touch screen), and/or a keyboard, and/or a mouse. A merchant device 252 further includes a network interface 258 for communicating over the network 254. The structure of the network interface 258 will depend on how the merchant device 252 interfaces with the network. For example, if the merchant device is a mobile phone or tablet, the network interface 258 may comprise a transmitter/receiver with an antenna to send and receive wireless transmissions to/from the network 254. If the merchant device is a personal computer connected to the network with a network cable, the network interface 258 may comprise a network interface card (NIC), and/or a computer port (e.g. a physical outlet to which a plug or cable connects), and/or a network socket, etc. A merchant device 252 further includes a processor 260 and a memory 262. The processor 260 directly performs or instructs all of the operations performed by the merchant device 252, e.g. preparing information for transmission over the network 254, processing data received over the network 254, instructing the display screen to display information, processing user inputs received through the user interface 256, etc. The processor 260 may be implemented by one or more processors that execute instructions stored in the memory 262. Alternatively, some or all of the processor 260 may be implemented using dedicated circuitry, such as an application specific integrated circuit (ASIC), a graphics processing unit (GPU), or a programmed field programmable gate array (FPGA).

The system 250 further includes an e-commerce platform 270. The e-commerce platform 270 includes a communications server 272, which is a server that executes an application that allows for merchants to communicate with each other and with customers over the network 254. The communications server 272 includes a processor 274 and an associated memory 276. The processor 274 may be implemented by one or more processors that execute instructions stored in the memory 276. Alternatively, some or all of the processor 274 may be implemented using dedicated circuitry, such as an ASIC, GPU, or FPGA. The communications server 272 further includes a network interface 278 for communicating over the network 254. The structure of the network interface 278 is implementation specific. For example, in some implementations the network interface 278 may comprise a NIC, and/or a computer port (e.g. a physical outlet to which a plug or cable connects), and/or a network socket, etc. The processor 274 directly performs or instructs all of the operations performed by the communications server 272, e.g. tracking which discussion groups each merchant follows, receiving message posts from merchant devices (via the network interface 278), pushing or transmitting message posts to the relevant merchant devices (via network interface 278), determining recommendations for discussion groups for one or more of the merchants, tracking settings for each merchant, etc.

The e-commerce platform 270 further includes a merchant data server 280, which is a component of the e-commerce platform 270 that maintains data relating to each merchant, e.g. merchant profiles, merchant settings, transaction data, product data, collection data, etc. The merchant data server 280 includes a memory 282 for storing all of the data. The merchant data server 280 further includes a processor 284 for directly performing or instructing all of the operations performed by the merchant data server 280. The processor 284 may be implemented by one or more processors that execute instructions stored in the memory 282. Alternatively, some or all of the processor 284 may be implemented using dedicated circuitry, such as an ASIC, GPU, or FPGA. The merchant data server 280 further includes a network interface 286 for communicating over the network 254. The structure of the network interface 286 is implementation specific. For example, in some implementations the network interface 286 may comprise a NIC, and/or a computer port (e.g. a physical outlet to which a plug or cable connects), and/or a network socket, etc. The merchant data server 280 may further include an API 288 for receiving requests for data from the communications server 272 and for providing the requested data to the communications server 272 via the network 254. The API 288 is shown as a separate component, but it may be implemented by the processor 284 and the network interface 286. For example, the structure of the API 288 may include the processor 284 and network interface 286, where the processor 284 executes instructions that cause the processor 284 to receive API calls through the network interface 286, to obtain the data requested in the API call, and to send the requested data through the network interface 286.

Although the communications server 272 and the merchant data server 280 are shown as two separate servers, they may actually be the same server in some implementations. Also, in some embodiments the server 272 and/or server 280 may be distributed or have distributed components (e.g. distributed over network 254). Also, in some embodiments, the server 272 and/or server 280 may instead be substituted with another computing system, and that other computing system may or may not have distributed components. In some embodiments, the e-commerce platform 270 may be the example e-commerce platform 100 described earlier, in which case the communications server 272 may be implemented as part of communications facility 129 (e.g. the merchant discussion group application code 202 may be executed by processor 274), and in which case the merchant data server 280 may include all or part of commerce management engine 136 and all or part of data facility 134.

In operation, a merchant may use his or her merchant device 252 to communicate with other merchants over network 254 via the sending and receiving of messages using the communications server 272 as an intermediary. For example, upon receipt of a message at the communications server 272 from a merchant device, the communications server 272 transmits the message to the intended recipient merchant devices. The communications server 272 facilitates group discussions between merchants. For example, the communications server 272 may associate a set of merchants with a discussion group. When a merchant is associated with a discussion group, the merchant is said to "belong to" the discussion group or "in" the discussion group or "following" the discussion group or "added" to the discussion group. This means that the merchant receives, at their merchant device, messages posted to the discussion group by other merchants that are also in the discussion group. The merchant also typically has the ability to use their merchant device to themselves post messages to that discussion group in order to actively participate in the group conversation. A merchant is said to be "participating" in a discussion group when the merchant is following the discussion group and possibly posting messages to the discussion group. A merchant is said to be "actively participating" in a discussion group when the merchant is following the discussion group and has recently posted a message to the discussion group.

Each discussion group is associated with an identifier that is stored in the communications server 272. The identifier uniquely identifies the discussion group. The identifier may be a title or label, e.g. "Shipping". A merchant wishing to post a message to the discussion group types their message on their merchant device in the appropriate input object on the user interface (e.g. under the "Shipping" heading). The message is transmitted to communications server 272 and stored in the memory 276 on the communications server 272 in association with the discussion group. The message is then transmitted, e.g. "pushed", to other merchant devices of merchants associated with that discussion group. The communications server 272 may add and remove merchants from discussion groups. The communications server 272 may request data from the merchant data server 280 in relation to a particular merchant, and use the requested data to recommend a discussion group for that merchant. The recommendation may be transmitted to the merchant's device and/or the communications server 272 may automatically add the merchant to the recommended discussion group.

Figure 5:
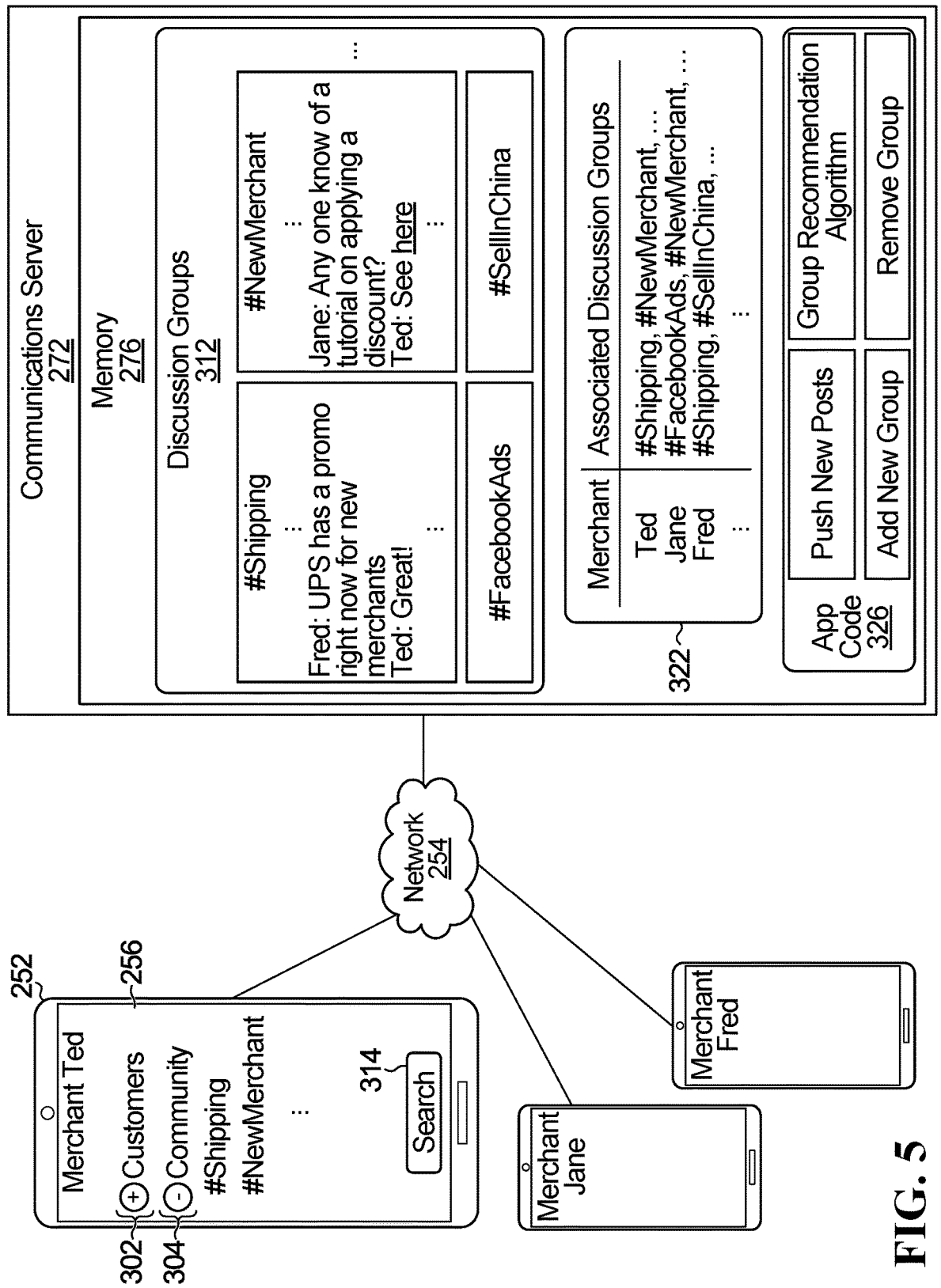
FIG. 5 illustrates a merchant device and memory of a communications server in more detail, according to one embodiment.

FIG. 5 illustrates both the merchant device 252 and the memory 276 of communications server 272 in more detail. When a merchant device is illustrated in this figure and in the remaining figures, it will be assumed that the merchant device is a mobile device, e.g. a mobile phone or tablet, but this is only an example.

The merchant device 252 includes user interface 256, which in this example is a touch screen displaying a vertically stacked list of headers 302 and 304. Each header can be selected by a user input to reveal or hide content. Header 302 is entitled 'Customers'. Header 302 is in a collapsed state, but if selected would expand to display any ongoing communications the merchant is having with the merchant's customers or potential customers. Header 304 is entitled 'Community'. Header 304 refers to the merchant community and it is in an expanded state to display merchant discussion groups that the merchant is following.

Figure 6:
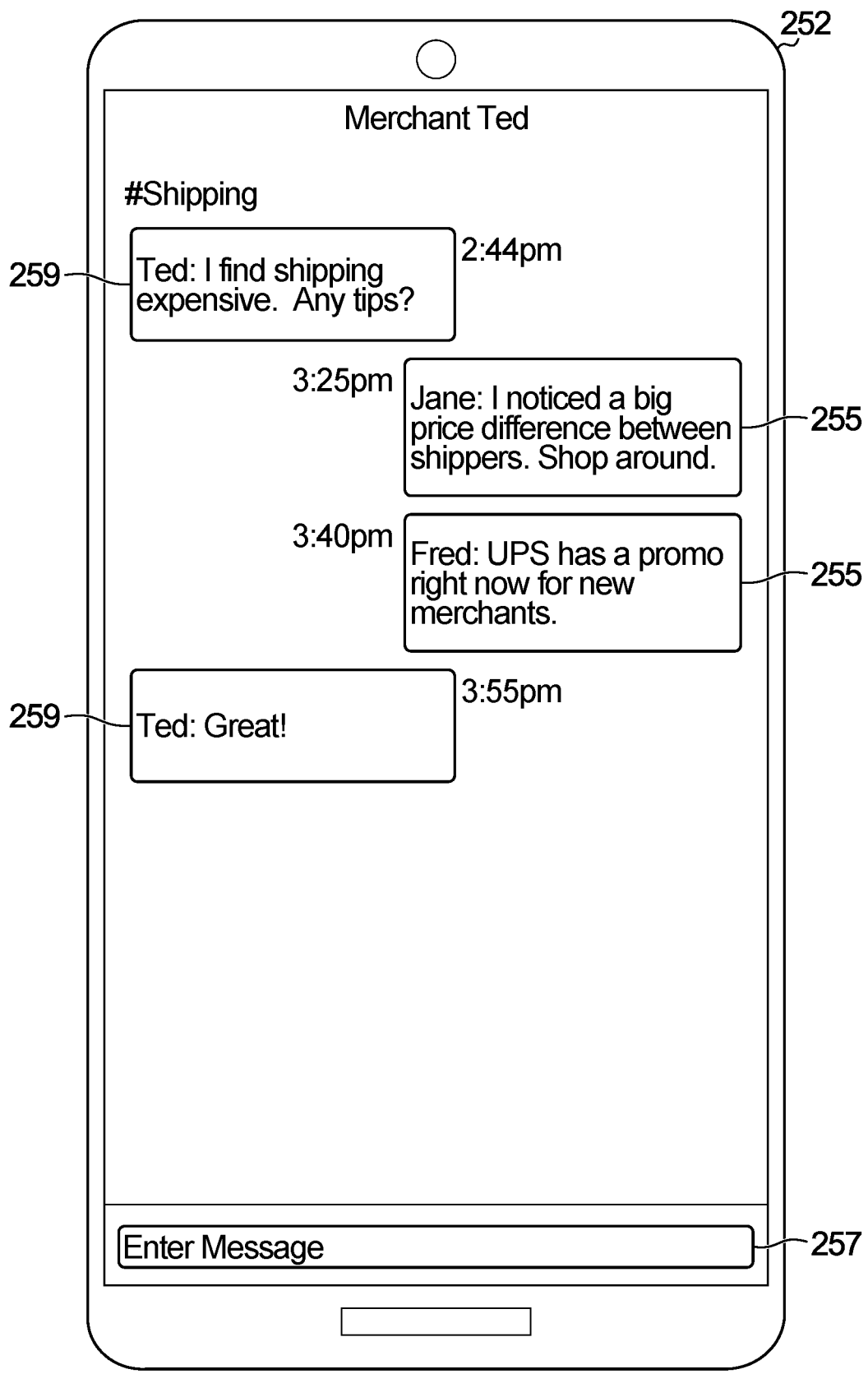
FIG. 6 illustrates an example discussion group message exchange on a merchant device, according to one embodiment.

The expanded menu under header 304 lists all of the discussion groups the merchant is following, e.g. #Shipping, #NewMerchant, etc. Selecting one of the discussion groups displays the messages posted to that group by other merchants. Messages may also be typed into the merchant device 252 and posted to the discussion group. For example, FIG. 6 illustrates the #Shipping discussion group on merchant device 252 for merchant Ted. Messages posted by other merchants participating in the #Shipping discussion group are displayed, e.g. at 255. Input object 257 allows merchant Ted to input a message that will also be posted to the #Shipping discussion group. For example, messages 259 were posted by Ted using input object 257.

Returning to FIG. 5, stored in the memory 276 of the communications server 272 are all of the existing discussion groups 312. In some embodiments, new discussion groups may be created at the request of merchants. In some embodiments, inactive discussion groups may be deleted by the communications server 272. In some embodiments, a merchant is not permitted to start a new discussion group, but can only follow pre-existing discussion groups. The pre-existing discussion groups may be default discussion groups established by the communications server 272.

The time-ordered sequence of messages posted to each discussion group is stored in association with that discussion group. For example, FIG. 5 illustrates four discussion groups: #Shipping, which is a discussion group relating to shipping products; #NewMerchant, which is a discussion group for new merchants; #FacebookAds, which is a discussion group for merchants using or interested in Facebook™ advertising; and #SellInChina, which is a discussion group for merchants who sell (or are interested in selling) to customers in China. These discussion groups are only examples, and many other or different discussion groups may exist. A merchant may use a search box 314 on the user interface 256 of their merchant device 252 to search for merchant discussion groups of interest that the merchant may wish to follow. As discussed in more detail below, in some embodiments a merchant may be automatically added to a recommended discussion group based on merchant-specific data, and/or a recommendation for a discussion group may be presented to the merchant on the user interface 256 of the merchant's device.

Also stored in memory 276 of the communications server 272 is an association between the merchant and each discussion group to which the merchant belongs. For example, a table 322 is illustrated in FIG. 5 that stores which discussion groups each merchant follows. The table 322 may be used to determine which discussion groups are to be presented on the merchant device for each merchant. A message posted to a particular discussion group will only be transmitted to merchant devices of merchants that, according table 322, follow that discussion group. In an alternative embodiment, instead of (or in addition to) table 322, each discussion group may store a list of which merchants follow that discussion group. When a message is posted to a particular discussion group, the message will only be transmitted to merchant devices of merchants that follow that discussion group.

Also stored in memory 276 is application code 326, which in this embodiment is code stored in memory and executed by the processor 274 of the communications server 272 in order to perform operations relating to facilitating the discussion groups. For example, code may be stored that, when executed, causes the processor 274 to communicate with the merchant devices (via the network interface 278), add/remove discussion groups 312, push messages posted to a discussion group to the relevant merchant devices, generate recommendations for discussion groups for merchants in the manner explained herein, etc.

Figure 7:
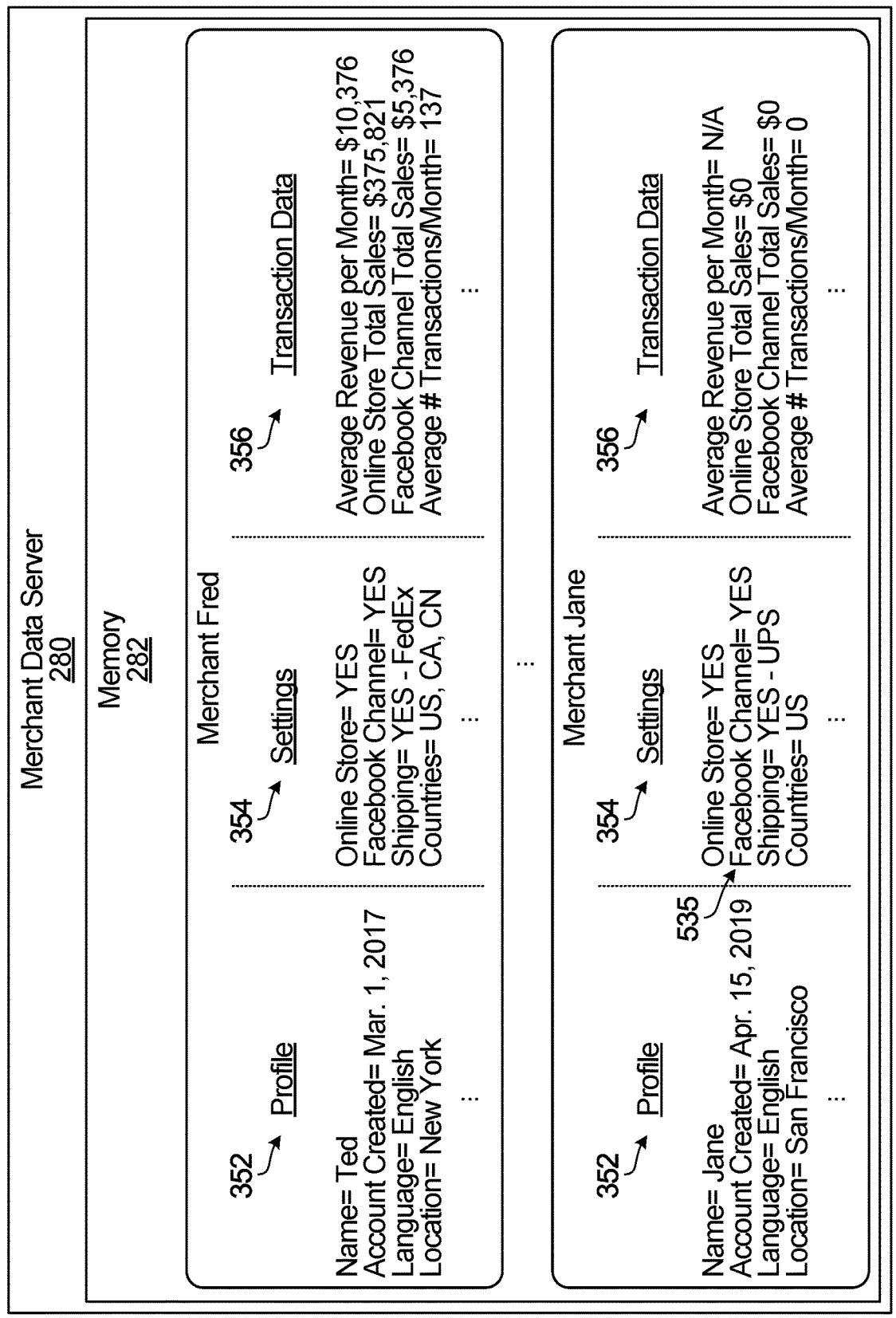
FIG. 7 illustrates the memory of the merchant data server in more detail, according to one embodiment.

FIG. 7 illustrates the memory 282 of the merchant data server 280 in more detail. Stored in memory 282 includes merchant-specific data for each merchant, which is recorded by the e-commerce platform 270. A few examples of merchant-specific data are illustrated in FIG. 7 for two merchants: "Fred" and "Jane".

Merchant-specific data may include profile data 352 that stores profile information relating to each merchant. A non-exhaustive list of profile data 352 that may possibly be stored includes: merchant's name; language spoken; merchant's location; age of merchant's account (i.e. how long has merchant been part of the e-commerce platform 270); merchant's gender; merchant's age or demographic, etc.

Merchant-specific data may include settings data 354 that stores particular settings in the e-commerce platform 270 related to each merchant. A non-exhaustive list of settings data that may possibly be stored includes: which sales channels the merchant uses (e.g. does the merchant have an online store, a Facebook™ channel, an Instagram™ channel, an Amazon™ marketplace channel, a physical store, etc.); is shipping enabled, and if so which shipping providers does the merchant use; in which countries does the merchant sell his/her products; which payment services does the merchant have enabled; etc.

Although profile data 352 is shown as being different from settings data 354, this is just an example. More generally, much or all of the data illustrated as "profile data 352" in FIG. 7 is actually just settings data stored in the e-commerce platform, e.g. merchant's language, merchant's location, etc.

Merchant-specific data may include transactions data 356 that stores data related to transactions between merchants and the merchant's customers. A non-exhaustive list of transactions data that may possibly be stored includes: sales revenue month-to-date and/or year-to-date; average monthly sales revenue; average yearly sales revenue; total amount of sales revenue for each sales channel (e.g. total amount of sales on online store channel, Facebook™ channel, Instagram™ channel, etc.), possibly categorized by year and/or by month; time elapsed since last sales transaction; total number of sales transactions; average number of sales transactions per month and/or per year; etc.

The communications server 272 may use the merchant-specific data stored in the merchant data server 280 in order to identify target discussion groups for a merchant, which may be of interest to the merchant. For example, merchant Jane has just joined the merchant discussion group application, and so the communications server 272 sends a query to the merchant data server 280 requesting merchant-specific data on merchant Jane. The returned data for merchant Jane indicates that she recently created an account with the e-commerce platform 270 and set up her online store, but that she has not made any sales yet. Based on this data, the communications server 272 identifies #NewMerchant as a target discussion group for Jane. The discussion group #NewMerchant may then be automatically added to the set of discussion groups that Jane follows in table 322 in FIG. 5, or a permission request message may be transmitted to Jane's device making the recommendation and seeking permission to add Jane to the #NewMerchant discussion group.

FIG. 8 illustrates two example user interfaces 256 of the merchant device 252 for merchant Ted in a situation in which merchant Ted has been automatically added to the discussion group #FacebookAds. Ted may have been automatically added to the discussion group #FacebookAds for the following reason:
(1) The communications server 272 obtained merchant-specific data stored for merchant Ted on the merchant data server 280, and that merchant-specific data revealed that Ted has a setting in the e-commerce platform 270 indicating that Ted has a Facebook™ sales channel ("Facebook™ sales channel=YES").
(2) The #FacebookAds discussion group is one of a subset of discussion groups specifically associated with the particular setting "Facebook™ sales channel=YES".
(3) The communications server 272 checks table 322 in FIG. 5 and notes that Ted is not associated with (i.e. does not already follow) #FacebookAds.
(4) The discussion group #FacebookAds is therefore automatically added to the set of discussion groups that Ted follows in table 322 in FIG. 5.

A message is transmitted to Ted's merchant device 252 to update the user interface 256 to add #FacebookAds as a displayed and selectable option under the collapsed "Community" header. As shown in Example 1 in FIG. 8, a message 362 may be displayed on the user interface 256 indicating that the discussion group is "newly added". In Example 2, a notification message 363 is instead displayed on the user interface 256 indicating that the #FacebookAds discussion group is "suggested".

Figure 9:
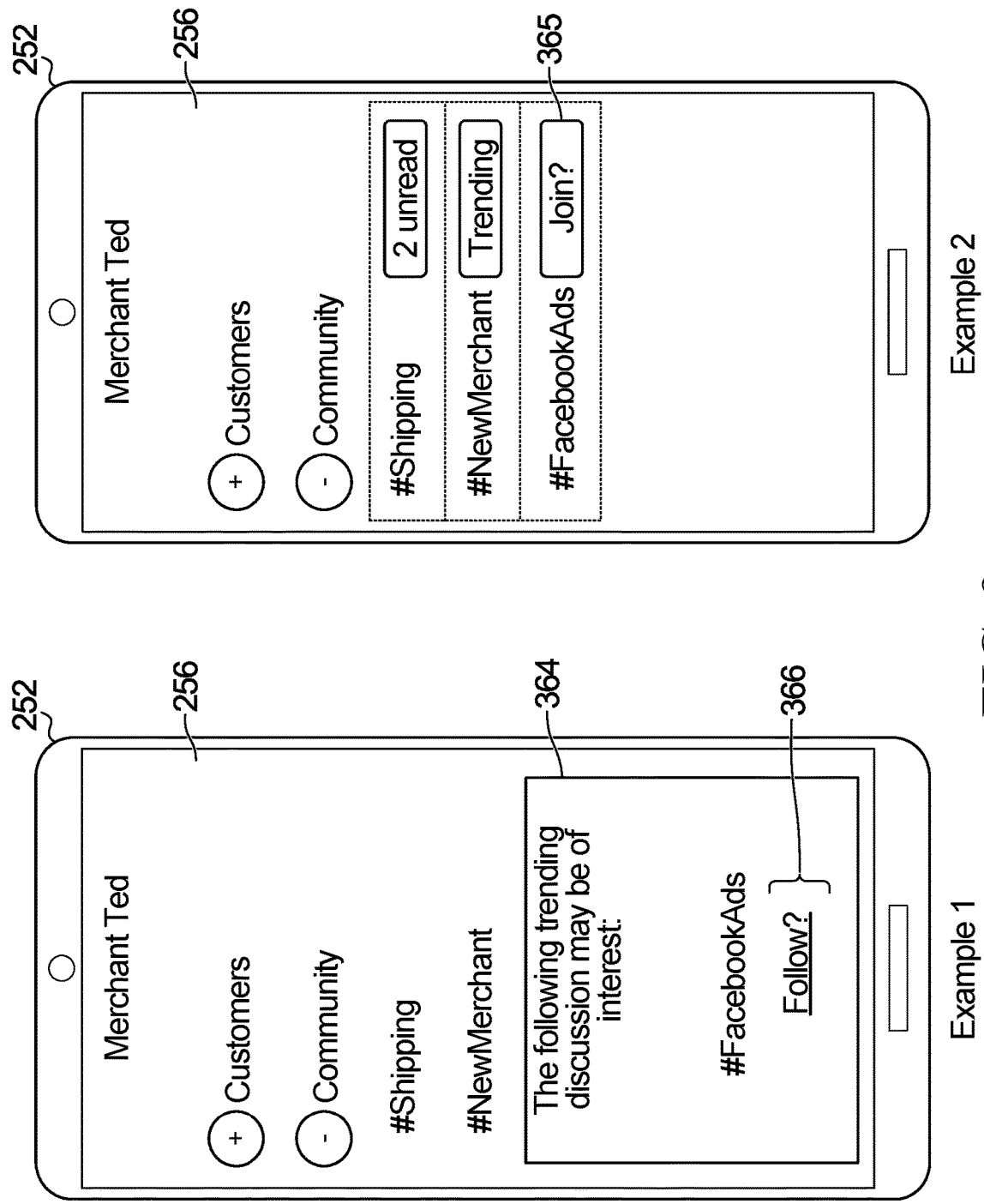

FIG. 9 illustrates two example user interfaces 256 of the merchant device 252 for merchant Ted in a situation in which a permission request is sent to merchant Ted recommending the discussion group #FacebookAds and seeking merchant Ted's permission to add Ted to the discussion group. The recommendation may have been made for the following reason:
(1) The communications server 272 obtained merchant-specific data stored for merchant Ted on the merchant data server 280, and that merchant-specific data revealed that Ted has a setting in the e-commerce platform 270 indicating that Ted has a Facebook™ sales channel ("Facebook™ sales channel=YES").
(2) The #FacebookAds discussion group is one of a subset of discussion groups specifically associated with the particular setting "Facebook™ sales channel=YES".
(3) The communications server 272 checks table 322 in FIG. 5 and notes that Ted is not associated with (i.e. does not already follow) #FacebookAds.
(4) A request recommending the discussion group #FacebookAds is therefore transmitted to Ted's merchant device.

The request message is displayed on the user interface 256 of the merchant device 252, e.g. as shown at 364 in Example 1 of FIG. 9. A selectable input object 366 embedded in the message may be selected by merchant Ted. The input object 366, when selected, causes the merchant device 252 to transmit a response message back to the communications server 272 indicating that merchant Ted agrees to follow the #FacebookAds discussion group. The discussion group #FacebookAds is then added to the set of discussion groups that Ted follows in table 322 in FIG. 5. A message is transmitted to Ted's merchant device 252 to update the user interface 256 to add #FacebookAds as a displayed and selectable option under the collapsed "Community" header. In Example 2 in FIG. 9, the request message displayed on the user interface 256 is simply the title of the recommended group (#FacebookAds) with an input object 365 indicating "Join?". If "Join" is selected, then a response message is sent back to the communications server 272, the "Join" input object 365 disappears, and #FacebookAds is added to the set of discussion groups that Ted follows.

Figure 10:
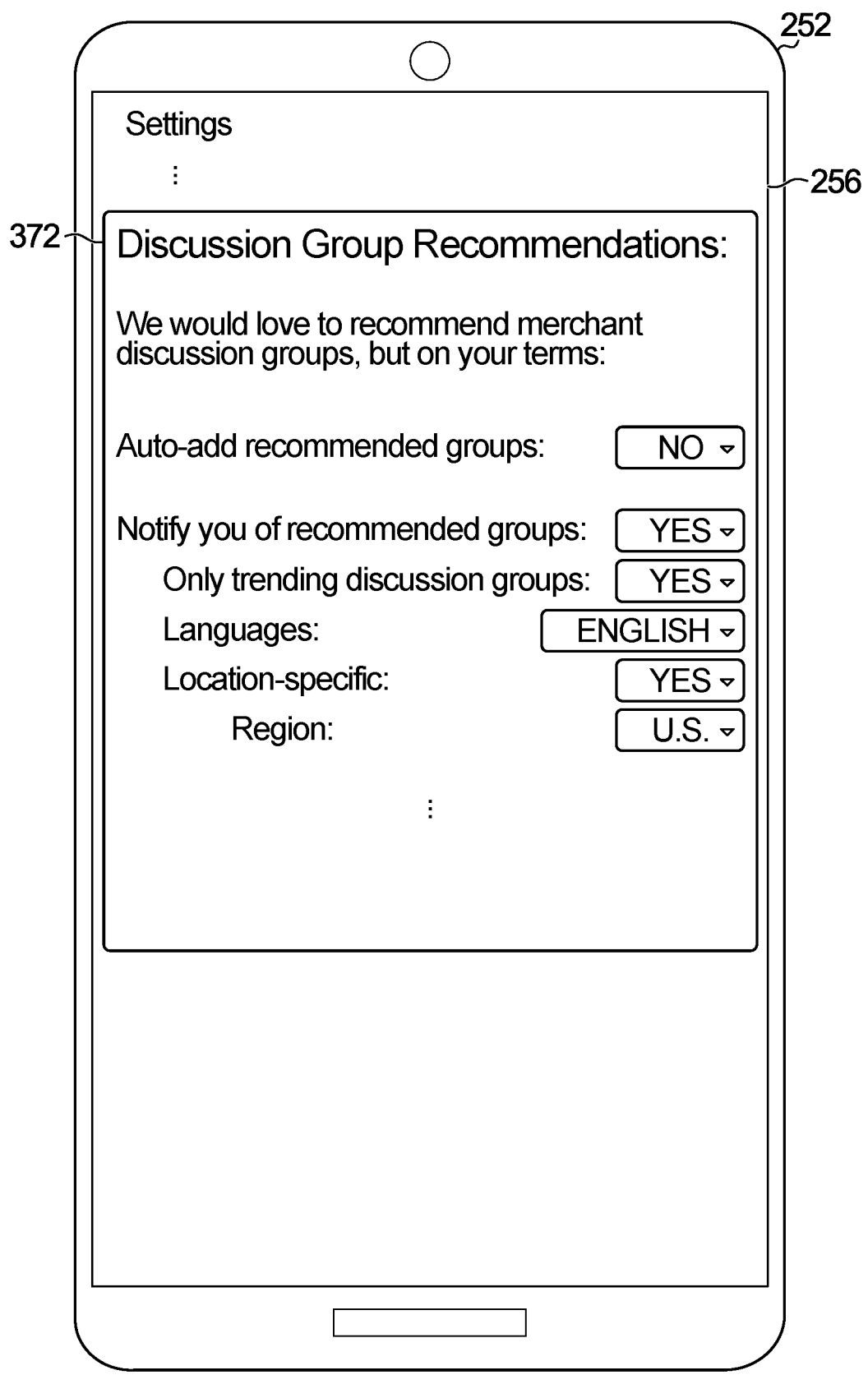
FIG. 10 illustrates a settings screen on a user interface of a merchant device, according to one embodiment.

In some embodiments, a merchant may use his/her merchant device 252 to modify settings that control aspects related to recommended discussion groups. For example, FIG. 10 illustrates a settings screen on the user interface 256 of merchant device 252, according to one embodiment. The settings screen includes a section 372 relating to settings for recommending discussion groups. The merchant provides his/her user input to select the appropriate settings, which are then transmitted and stored on communications server 272. The communications server 272 acts in accordance with the rules set by the merchant and stored at the communications server 272 whenever the communications server 272 identifies target discussion groups for the merchant. A non-exhaustive list of example settings that impact which target discussion groups are identified possibly include only identifying discussion groups that are: trending, and/or recently updated, and/or location specific (country/city etc.), and/or language specific, and/or involving similar merchants (similar products, services, etc.).

Example ways in which the communications server 272 may identify target merchant discussion groups for a merchant will now be described in more detail.

Identifying Merchant Discussion Groups Based on Merchant Categories

In some embodiments, merchant-specific data may be used to categorize a merchant as belonging to a particular category of a plurality of merchant categories. A target merchant discussion group may be identified for a merchant based on the category to which the merchant belongs. A non-exhaustive list of examples of merchant categories include:

Categories based on the merchant's development phase, e.g. based on the state of the merchant's business. For example, there may be a set of different categories, each category corresponding to a respective state of the merchant's business, like the example discussed below in relation to FIG. 11.

Categories based on the products and/or services for sale by the merchant. For example, there may be a set of different categories, each category corresponding to a respective different product or product-type. As another example, there may be a set of different categories, each category corresponding to a respective different collection or collection-type. As another example, there may be a set of different categories, each category corresponding to a respective different service or service type.

Categories based on industry to which the merchant belongs. For example, there may be a set of different categories, each category corresponding to a respective different industry (e.g. one category for fashion, another category for electronics, etc.).

In some embodiments, the set of categories may include categories from different ones of the examples above, e.g. there may be categories based on industry, categories based on products, and categories based on state of the merchant's business.

In some embodiments, merchant-specific data is used to categorize the merchant into one or more categories, and a recommendation for a discussion group is made based on the category or categories to which the merchant belongs. An example will be explained below in which a target discussion group is identified for a merchant based on the merchant's development phase, e.g. the state of the merchant's business.

The state of the merchant's business may be obtained by the processor 274 based on merchant-specific data for the merchant that is stored on the merchant data server 280. For example, the data stored for merchant Jane in FIG. 7 indicates that merchant Jane recently created an account and has not yet made a first sale. Therefore, the processor 274 may identify Jane's merchant development phase as "New Merchant". The category "New Merchant" may be associated with a particular subset of the existing discussion groups. The discussion groups associated with the category "New Merchant" are deemed to have relevance to a new merchant, e.g. #NewMerchant, #HowToFindCustomers, etc. One or more of the associated discussion groups may be identified as a target discussion group and automatically associated with Jane, e.g. the target discussion group may be automatically added to the set of discussion groups that Jane follows (e.g. in the way described in relation to FIG. 8). Alternatively, a message may be sent to Jane requesting permission to add Jane to the target discussion group (e.g. in the way described in relation to FIG. 9).

Figure 11:
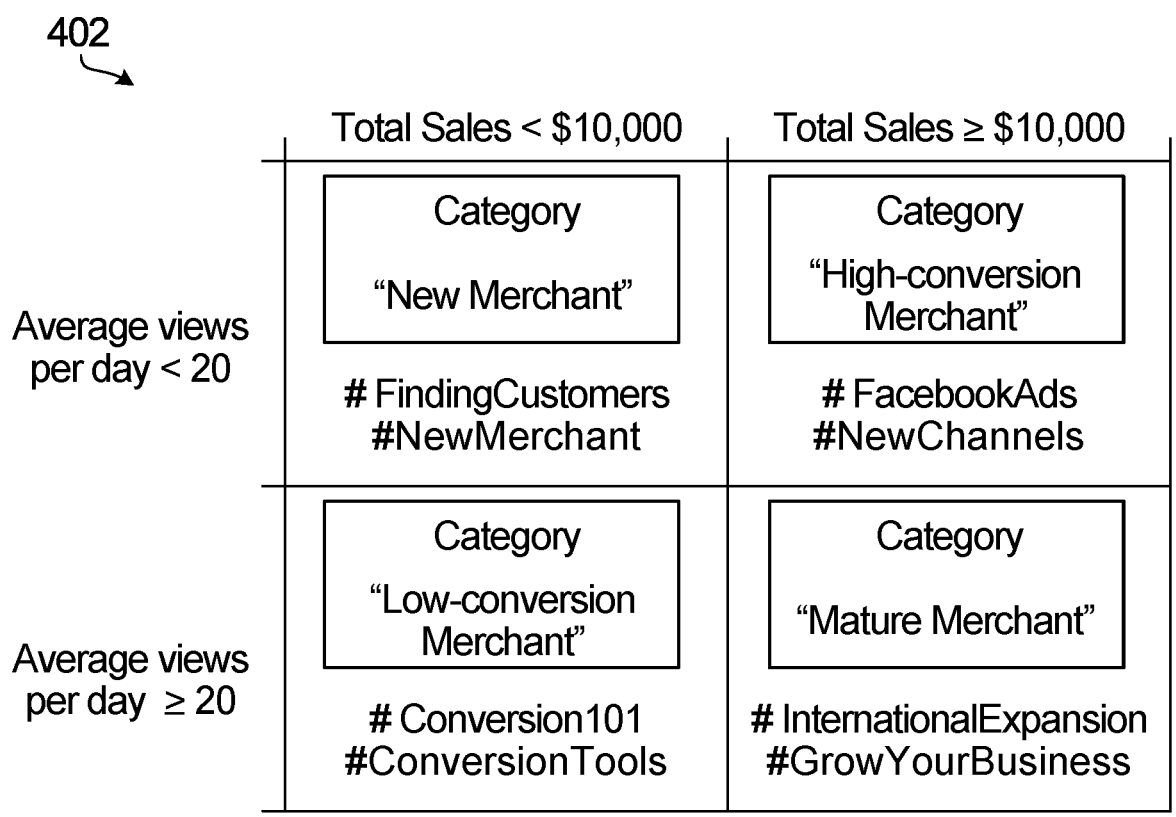
FIG. 11 illustrates an example of four categories, each of which corresponds to a respective different merchant development phase.

FIG. 11 illustrates an example of four categories, each of which corresponds to a respective different merchant development phase. An example mapping between merchant-specific data and the categories is also illustrated, which allows for a merchant to be categorized into one of the categories based on the merchant-specific data for that merchant. The mapping may be a look-up-table 402 stored in the memory 276 of the communications server 272.

For each merchant on the e-commerce platform 270, the following data relating to the merchant's development phase is retrieved from the merchant data server 280: (1) the total sales the merchant has made for a given period of time, and (2) the average number of visits or views per day of the merchant's online store or the merchant's products or catalog via other channels. Depending upon the total sales to date and the average number of visits or views, the merchant's development phase is mapped to one of four categories:

"New Merchant" (low traffic, low sales): One or more existing merchant discussion groups are associated in memory with this category, e.g. a discussion group for new merchants (#NewMerchant), a discussion group about finding customers (#FindingCustomers), etc.

"High-conversion Merchant" (low traffic, high sales): One or more existing merchant discussion groups are associated in memory with this category, e.g. a discussion group about expanding to other sales channels (#NewChannels), a discussion group relating to advertising (e.g. #FacebookAds), etc.

"Low-conversion Merchant" (high traffic, low sales): One or more existing merchant discussion groups are associated in memory with this category, e.g. a discussion group about conversion analysis tools (#ConversionTools), a discussion group about the basics of conversion (#Conversion101), etc.

"Mature Merchant" (high traffic, high sales): One or more existing merchant discussion groups are associated in memory with this category, e.g. discussion groups relating to expanding the business, such as #GrowYourBusiness, #InternationalExpansion, etc.

A specific example is given in FIG. 11 in which a merchant is mapped to one of the four categories based on whether or not the average number of website visits to the merchant's online store is below 20 visits per day, and based on whether or not the total sales made by the merchant to date is below $10,000. Based on the category to which the merchant's development phase is mapped, one or more existing discussion groups associated with that category are identified as a target discussion group for that merchant. In some embodiments, identified target discussion groups may be further filtered for a particular merchant based on one or more of the other factors discussed herein, e.g. if the merchant has indicated in settings that the merchant is only interested in discussion groups with merchants in a particular region, then only discussion groups having a majority of merchants in that particular region are identified. An identified target discussion group may be recommended to the merchant (like in FIG. 9) or automatically added to the set of discussion groups associated with the merchant (e.g., like in FIG. 8 with the discussion group being added to table 322 of FIG. 5).

In some embodiments, a discussion group is associated with one of the four categories in FIG. 11 by the communications server 272. The discussion group may be selected from a pre-existing set of default discussion groups. For example, a merchant may not be permitted to start a new discussion group, but only allowed to follow pre-existing discussion groups that are established by the communications server 272. A system designer may select which discussion group is associated with each of the four categories in FIG. 11. In other embodiments, a discussion group may be dynamically associated with one of the four categories in FIG. 11 based on merchant-specific data associated with the merchants that participate in that discussion group. For example, if a new discussion group is started by merchant Jane, and merchant Jane is categorized as "New Merchant", and/or the majority of participants in that discussion group are categorized as "New Merchant", then the discussion group may be associated with the "New Merchant" category in the look-up-table 402.

Figure 12:
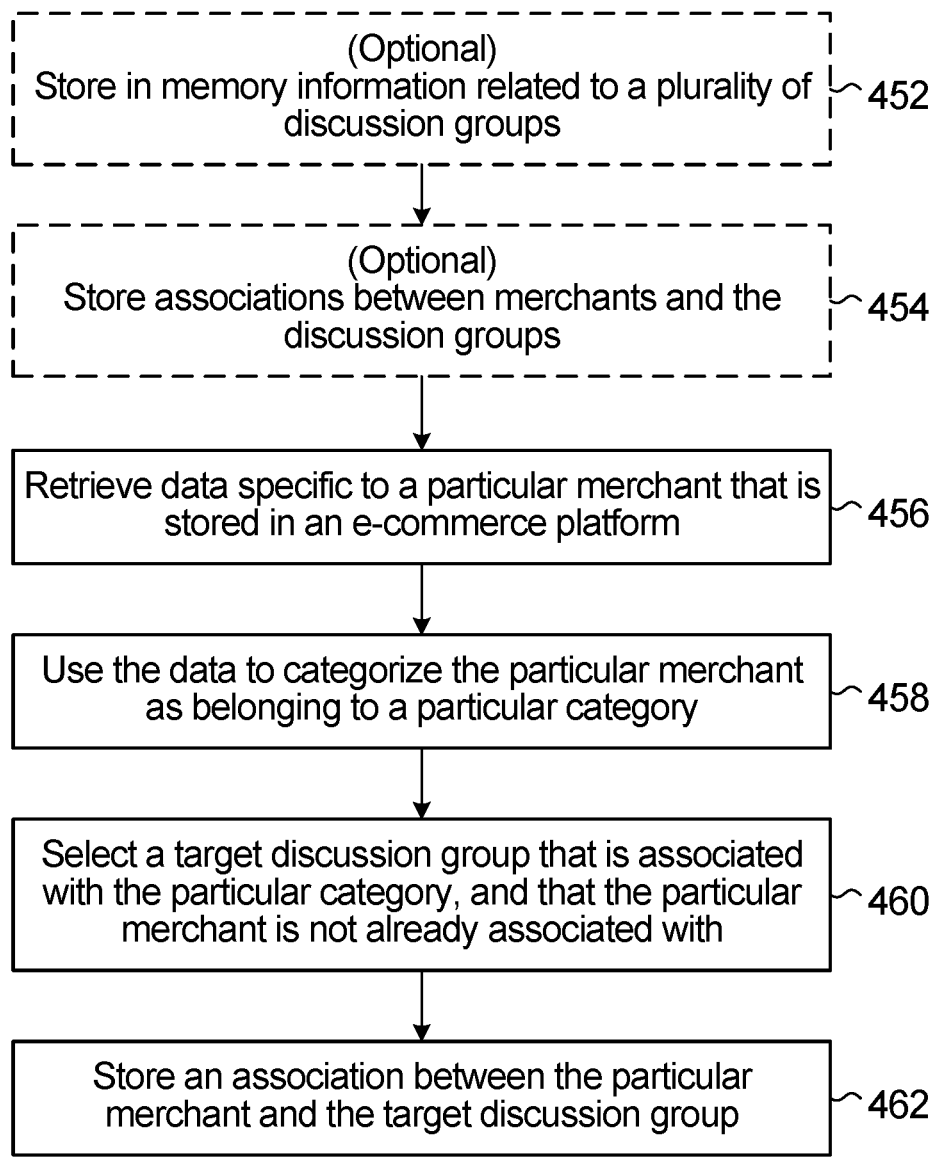
FIG. 12 illustrates a computer-implemented method performed by a system, according to one embodiment.

FIG. 12 illustrates a computer-implemented method performed by a system, according to one embodiment. For the sake of example, the method of FIG. 12 will be described as being performed by the processor 274 of communications server 272.

In optional step 452, the processor 274 stores in memory 276 information related to a plurality of discussion groups. The information includes: (i) an identifier for each discussion group that uniquely identifies the discussion group, and (ii) for each discussion group a time-ordered sequence of messages that belong to the discussion group. An example of such information is that shown in discussion groups 312 in FIG. 5. For example, the label #Shipping is an identifier that uniquely identifies that discussion group, and the time-ordered sequence of messages include those shown under the label #Shipping in FIG. 5 (and also on the user interface in FIG. 6). Step 452 is optional in the embodiment of FIG. 12 because the method may instead begin at a later point in time, e.g. at step 456.

In optional step 454, the processor 272 stores in memory 276 associations between merchants and the discussion groups. One example way to store the associations is table 322 in FIG. 5, which shows an association between each merchant and a respective subset of the discussion groups. Another example way to store the associations is to have a table (not illustrated) in which each discussion group has associated in memory a respective subset of the merchants. In any case, at least two of the discussion groups may each be associated with a respective different set of merchants. That is, different discussion groups may have different merchants associated therewith. For example, discussion group #Shipping may be associated with Jane and Fred, but not Ted, and discussion group #NewMerchant may be associated with Ted and Jane, but not Fred. A message belonging to a discussion group is transmitted to merchant devices of the merchants associated with the discussion group. Step 454 is optional in the embodiment of FIG. 12 because the method may instead begin at a later point in time, e.g. at step 456.

The following steps are performed for a particular merchant. The particular merchant may be a particular user/person (e.g. merchant Fred) or a particular company, or a particular online store. In step 456, the processor 274 retrieves data specific to the particular merchant that is stored in an e-commerce platform. For example, the processor 274 may retrieve merchant specific data for Fred stored in merchant data server 280 of e-commerce platform 270.

In step 458, the processor 274 uses the data to categorize the particular merchant as belonging to a particular category of a plurality of merchant categories. Each category of the plurality of merchant categories has associated therewith a respective subset of the discussion groups. In some embodiments, each category of the plurality of categories corresponds to a respective different merchant development phase, e.g. the four categories shown in FIG. 11. The processor 274 may perform the categorizing step by using the look-up-table 402 in FIG. 11 to map the merchant to one of the four categories in FIG. 11. For example, the data retrieved for merchant Fred indicates that Fred has total sales greater than $10,000, and more than twenty website visits per day on average to Fred's online store. Look-up-table 402 therefore maps this merchant-specific data for Fred to the category "Mature Merchant". Fred is thereby categorized as "Mature Merchant".

In step 460, the processor 274 selects a target discussion group that the particular merchant is not already associated with. The target discussion group is selected from the subset of the discussion groups associated with the particular category. For example, the "Mature Merchant" category has associated therewith a subset of discussion groups including #InternationalExpansion and #GrowYourBusiness. Table 322 reveals that Fred is not already associated with the discussion group #InternationalExpansion. Therefore, #InternationalExpansion is selected as a target discussion group for Fred.

In step 462, the processor 274 stores in the memory 276 an association between the particular merchant and the target discussion group in order to associate the particular merchant with the target discussion group. For example, table 322 may be updated to add #InternationalExpansion to Fred's entry in the table 322. Fred is now following the discussion group #InternationalExpansion.

The merchant categories do not have to correspond to different merchant development phases. As discussed above, the categories may be based on other parameters, such as merchant type categories. Merchant type categories may be based on products and/or services offered by the merchant, and/or industries to which the merchant belongs, and/or merchant location, etc. In some embodiments, the merchant type category for a particular merchant may be updated or changed dynamically if new products/services are added to/removed from the merchant's store. This may then affect which discussion groups may be recommended or removed for the merchant. For example, if a merchant adds a new collection or a new product, the merchant may be categorized at belonging to a new category, and a target discussion group associated with the new category (and not yet associated with the merchant) may be recommended.

In some embodiments, before performing step 462, i.e. before associating the particular merchant with the target discussion group, the following steps may first be performed. A request may be transmitted over a network to a merchant device of the particular merchant. The request recommends that the particular merchant be associated with the target discussion group. A response is received over the network from the merchant device of the particular merchant. The response authorizes that the particular merchant be associated with the target discussion group. Examples are shown and described in relation to FIG. 9. The request may be a message transmitted over network 254 to merchant device 252 and displayed on the user interface of the merchant's device. The response may be generated and sent back to the communications server 272 upon the merchant selecting input object 365 or 366 in FIG. 9.

In some embodiments, the data specific to the particular merchant that is retrieved in step 456 is first data, the particular category is a first category, the target discussion group is a first target discussion group, and the method of FIG. 12 further includes: (1) retrieving second data specific to the particular merchant, the second data being retrieved after associating the particular merchant with the first target discussion group; using the second data to remove the particular merchant from the first category and instead categorize the particular merchant as belonging to a different second category of the plurality of categories; (3) selecting a second target discussion group that the particular merchant is not already associated with, the second target discussion group being selected from the subset of the discussion groups associated with second category; and (4) storing in the memory an association between the particular merchant and the second target discussion group in order to associate the particular merchant with the second target discussion group. For example, merchant Jane may be categorized as "New Merchant" in step 458 of FIG. 12, and the discussion group #NewMerchant may be associated with Jane in the memory (e.g. in table 322). Subsequently, updated data retrieved for Jane indicates that now Jane has many website visits to her online store but still a small dollar amount in sales. Based on this updated data, the processor 272 now instead categorizes Jane as "Low-conversion Merchant". Jane may then be added to a new discussion group that is associated with the category "Low-conversion Merchant" and that Jane is not already following, e.g. #Conversion101.

In some embodiments, the method then further includes deleting from the memory the association between the particular merchant and the first target discussion group and/or replacing the association with an association with another discussion group that may be more relevant or applicable. For example, if Jane is re-categorized as "Low-conversion Merchant", then Jane may no longer be associated with the discussion group #NewMerchant and/or instead be associated instead with the #Conversion101 discussion group.

In some embodiments, prior to deleting from the memory the association between the particular merchant and the first target discussion group, the following steps are performed: (1) transmitting a request over a network to a merchant device of the particular merchant, the request querying whether the particular merchant is to still be associated with the first target discussion group; and (2) receiving a response over the network from the merchant device of the particular merchant, the response indicating that the particular merchant is to no longer be associated with the first target discussion group. For example, a message may be transmitted to Jane's device asking whether Jane would like to be removed from the #NewMerchant discussion group. If Jane responds "yes", then the association between Jane and #NewMerchant is deleted from table 322. In some embodiments, the request for removing or deleting a particular discussion may be coupled with a request for adding another discussion group which may be more applicable or relevant.

In some embodiments, a discussion group in the subset of discussion groups associated with one category is different from another discussion group in the subset of discussion groups associated with another category. For example, the subset of discussion groups associated with the category "New Merchant" in FIG. 11 includes discussion group #NewMerchant. The discussion group #NewMerchant is different from another discussion group associated with another category in FIG. 11. In some embodiments, a discussion group in the subset of discussion groups associated with the particular category is different from each other discussion group in the subset of discussion groups associated with another category, e.g. #NewMerchant is a discussion group different from all of the discussion groups associated with the category "Mature Merchant". In some embodiments, a discussion group in the subset of discussion groups associated with the particular category is different from the discussion groups in each other subset of discussion groups associated with each other category of the plurality of categories, e.g. #Conversion101 is associated with the category "Low-conversion Merchant", and #Conversion101 is different from any other discussion group associated with any other category in FIG. 11.

In some embodiments, for each category of the plurality of categories: a discussion group in the subset of discussion groups associated with the category is different from the discussion groups in each other subset of discussion groups associated with each other category of the plurality of categories. For example, in FIG. 11, the illustrated subset of discussion groups associated with each category are different from the illustrated discussion groups associated with each other category. That is, each category has its own unique discussion groups associated therewith that are not associated with other categories.

In some embodiments, the data specific to the particular merchant retrieved in step 456 may include an indication of a quantity of visits to an online store of the particular merchant. A visit may be registered if at least one page or element of a merchant online store is sent to a customer device. In some embodiments, the page or element of the merchant online store may be sent via any channel e.g. online store, blog post, POS device, etc. In some embodiments, the visits are website visits to the webpage of the merchant's online store. In some embodiments, the quantity of visits may be within a particular time period (e.g. last 30 days, during Christmas season, during back-to-school season, etc.), or associated with one or more particular parameters (e.g. quantity of visits from a particular country).

In some embodiments, the data specific to the particular merchant retrieved in step 456 may include an indication of or information related to one, some, or all of the following: store visits (possibly specific to or categorized by country); sales data; customer shipping addresses; quantity of sales and/or visits for a particular time period or event (e.g. Christmas season, back-to-school, season, etc.).

In some embodiments, the data specific to the particular merchant retrieved in step 456 may include information relating to number of sales and/or dollar amount of sales of one or more products sold by the particular merchant using the e-commerce platform. In some embodiments, each category of the plurality of merchant categories corresponds to a respective different merchant development phase. In some embodiments, one merchant development phase corresponds to a first quantity of online store website visits and/or first sales data, and another merchant development phase corresponds to a second quantity of online store website visits and/or second sales data, e.g. like in FIG. 11. In some embodiments, each category of the plurality of merchant categories corresponds to a respective merchant type. Merchant type categories may be based on parameters such as products and/or services offered by the merchant, and/or industries to which the merchant belongs, etc.

In some embodiments, the method of FIG. 12 may further include: (1) receiving a request over a network from a merchant device of a merchant, the request to create a new discussion group; (2) storing in the memory a new identifier for the new discussion group that uniquely identifies the new discussion group; (3) storing in the memory subsequent messages that belong to the new discussion group; and (4) associating the new discussion group with a given category of the plurality of categories. In some embodiments, the merchant that requested to create the new discussion group belongs to the given category. In some embodiments, the majority of merchants associated with the new discussion group belong to the given category. For example, merchant Jane may decide that she wants to start a new discussion group she calls #NewbieHacks. Jane sends a request (via her merchant device) to server 272 to create the new discussion group. The processor 274 stores the new identifier (#NewbieHacks) for the group in discussion groups 312, along with any subsequent messages that belong to the new discussion group. The processor 274 also decides which category in FIG. 11 to associate the new group with, and stores the association. In some embodiments, the new group may be associated with the category "New Merchant" because that is the category in FIG. 11 to which merchant Jane is belong. In some embodiments, the new group may be associated with the category "New Merchant" because that is the category to which the majority of merchants associated with or participating in (e.g. posting messages in) the new group discussion belong.

In some embodiments, the subset of discussion groups associated with a merchant category may include one or more discussion groups that relate to another merchant category. This may allow for a discussion group relating to one merchant category to be associated with (e.g. recommended to) a merchant in another merchant category. For example, a merchant may be mapped to the merchant category "New Merchant" in FIG. 11. However, the merchant may benefit from discussion groups related to one of the other merchant categories (e.g. related to "Mature Merchant") because such group discussions could potentially provide the merchant with information and interactions that encourage the merchant to increase their business and move beyond the "New Merchant" category. Therefore, in some embodiments, one or more merchant discussion groups related to another category (e.g. related to "Mature Merchant") may be associated with the category "New Merchant" and recommended to a merchant in the category "New Merchant". The decision to make the recommendation may be based on other factors also, e.g. the similarity between merchants. For example, a first merchant in the category "New Merchant" may be similar to a second merchant in the category "Mature Merchant" (e.g. the first merchant and the second merchant may have something in common, such as sell the same category of products or services, and/or live in the same geographical location, and/or sell on the same sales channels, etc.). A discussion group that is associated with the second merchant may be recommended to the first merchant. In some embodiments, a merchant category may have associated therewith discussion groups related to a next/subsequent merchant development phase, e.g. the merchant category "New Merchant" may have associated therewith some discussion groups related to next merchant development phase/category "Growing Merchant".

Identifying Merchant Discussion Groups Based on Stored Settings

In some embodiments, a merchant discussion group may be identified for a merchant based on the merchant's particular settings stored in the e-commerce platform 270. The particular settings for the merchant may be obtained by the processor 274 from the merchant data server 280. For example, the data stored for merchant Fred in FIG. 7 indicates that merchant Fred has a Facebook™ sales channel. The communications server 272 may store in its memory a list of all existing merchant discussion groups associated with Facebook™, e.g. #SellingOnFacebook, #FacebookAds, #FacebookHacks, etc. This list may be the subset of discussion groups associated with the setting "Facebook™ sales channel=YES". This list of associated discussion groups may be static and possibly pre-populated by communications server 272. Alternatively, associated discussion groups may be dynamically added or removed from the list based on factors such as: use of the term "Facebook" in the title of the discussion group, and/or number of times the word "Facebook" appears in the conversation in the discussion group, and/or percentage of merchants following the discussion group that have a Facebook™ sales channel, etc.

Based on the settings data indicating that merchant Fred has a Facebook™ sales channel, the processor 274 may identify for Fred one or more of the discussion groups associated with that setting. In some embodiments, identified discussion groups may be further filtered for a particular merchant based on one or more of the other factors discussed herein. For example, if Fred is also categorized as a "Mature Merchant" in the table in FIG. 11, then perhaps only discussion groups are identified for Fred that meet the criteria of both: associated with the setting "Facebook™ sales channel=YES", and the majority of participants in the discussion group are also categorized as "Mature Merchant". An identified discussion group may be recommended to Fred or automatically added to the set of discussion groups associated with Fred.

As another example, the settings data stored for merchant Fred in FIG. 7 may indicate that merchant Fred uses the FedEx™ shipping service, i.e. "FedEx™ shipping service=YES". Existing discussion groups associated with FedEx™ may therefore be recommended to Fred or automatically added to the set of discussion groups associated with Fred, e.g. #Shipping, #FedEx, etc. Additionally, or instead, the communications server 272 may identify trending topics or terms in discussion groups. When "FedEx" is trending in a discussion group, that discussion group may be associated with the setting FedEx™ shipping service=YES" and also recommended to Fred or automatically added to the set of discussion groups associated with Fred. In some embodiments, when "FedEx" is included in the title of a new discussion group (e.g. #FedExTips), then that discussion group may be associated with the setting FedEx™ shipping service=YES" and recommended to Fred or automatically added to the set of discussion groups associated with Fred.

Note that a discussion group is said to be "trending" if the discussion group is experiencing a high volume of postings by many active participants. A topic or term may be said to be "trending" if the topic or term is actively discussed on one or more discussion groups.

In another example, the settings data stored for merchant Fred in FIG. 7 may indicate that merchant Fred sells products in China. Existing discussion groups associated with the setting "Sells in China=YES" may therefore be recommended to Fred or automatically added to the set of discussion groups associated with Fred, e.g. #SellInChina.

The communications server 272 may store a mapping of the association between different e-commerce platform settings and different discussion groups. A non-exhaustive list of example settings include: a particular application has been installed by the particular merchant on the e-commerce platform; a particular sales channel is used by the particular merchant; a particular payment method is used by the particular merchant; a particular shipping service is used by the particular merchant; a discount is applied by the particular merchant; a particular product or product-type is sold by the particular merchant; a particular collection is sold by the particular merchant; a particular preference has been indicated by the particular merchant on the e-commerce platform; the merchant's location; the merchant's language; etc. Note that although the example in FIG. 7 illustrates information under "profile 352", more generally this data can be characterized as settings data. Some of the data illustrated under "transaction data 356" may also be characterized as settings data.

FIG. 13 illustrates an example look-up-table 502 of a plurality of settings, each setting having associated therewith a respective subset of discussion groups. Table 502 may be stored in memory 276 of the communications server 272.

The table 502 is independent of merchants, but instead lists a plurality of settings, and the discussion groups associated with each of those settings. For example, the setting "Facebook™ sales channel=YES" (i.e. merchant has a Facebook™ sales channel) is associated with a subset of discussion groups including #FacebookAds and #FacebookHacks. As another example, the setting "DiscountApplied=YES" (i.e. a merchant has applied a discount to one of their products) is associated with a subset of discussion groups including #WhenToRemoveDiscounts and #LeveragingDiscounts. If a particular merchant has a particular setting (e.g. merchant Jane has the setting "Facebook™ sales channel=YES", i.e. merchant Jane has a Facebook™ sales channel), then a target discussion group may be identified for the merchant that the merchant does not yet follow and that is associated with the setting. For example, if merchant Jane has the setting "Facebook™ sales channel=YES", then the target discussion group #FacebookHacks may be identified because: (1) #FacebookHacks is associated with the "Facebook™ sales channel=YES" setting, and (2) table 322 indicates that Jane does not already follow #FacebookHacks.

The settings for each merchant may be recorded by the e-commerce platform 270 (e.g. stored in merchant data server 280), and the indication of the setting for a merchant may either be pushed to the communications server 272 or periodically pulled by the communications server 272, e.g. via periodic polling of the merchant data server 280.

Figure 14:
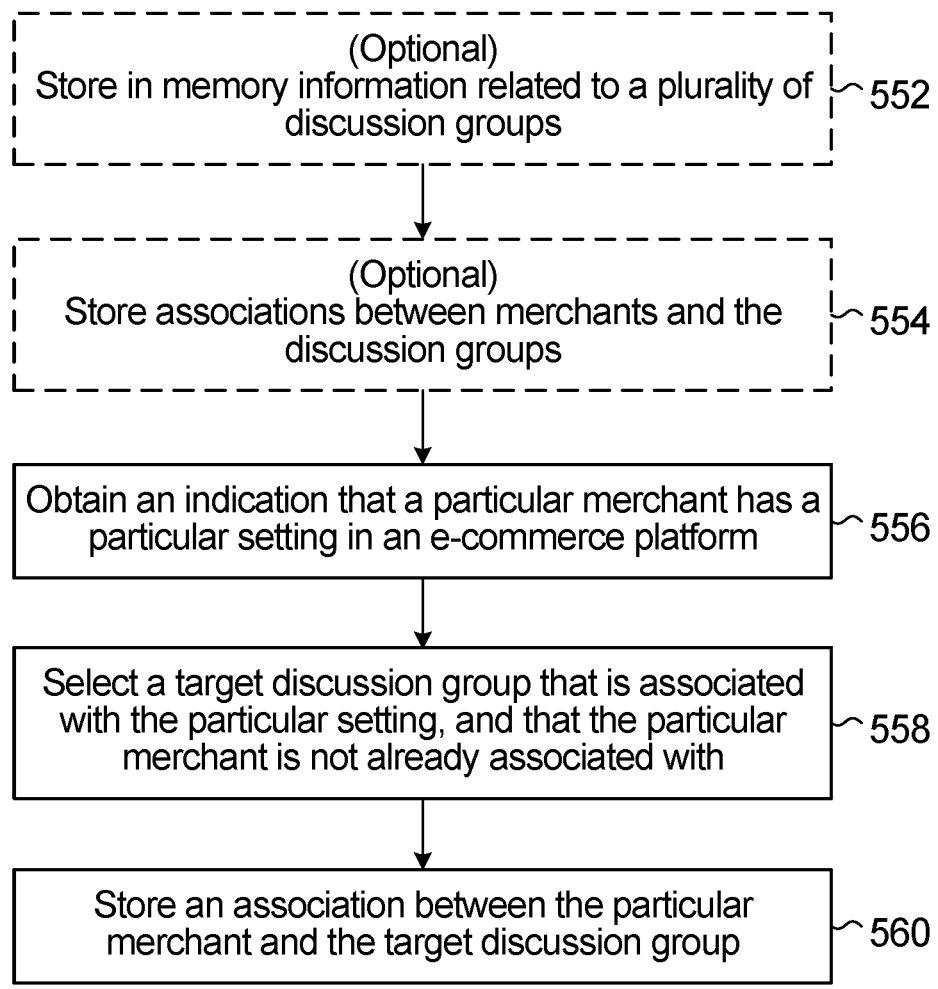
FIG. 14 illustrates a computer-implemented method performed by a system, according to another embodiment.

FIG. 14 illustrates a computer-implemented method performed by a system, according to one embodiment. For the sake of example, the method of FIG. 14 will be described as being performed by the processor 274 of communications server 272.

In optional step 552, the processor 274 stores in memory 276 information related to a plurality of discussion groups. The information includes: (i) an identifier for each discussion group that uniquely identifies the discussion group, and (ii) for each discussion group a time-ordered sequence of messages that belong to the discussion group. An example of such information is that shown in discussion groups 312 in FIG. 5. For example, the label #Shipping is an identifier that uniquely identifies that discussion group, and the time-ordered sequence of messages include those shown under the label #Shipping in FIG. 5 (and also on the user interface in FIG. 6). Step 552 is optional in the embodiment of FIG. 14 because the method may instead begin at a later point in time, e.g. at step 556.

In optional step 554, the processor 272 stores in memory 276 associations between merchants and the discussion groups. One example way to store the associations is table 322 in FIG. 5, which shows an association between each merchant and a respective subset of the discussion groups. Another example way to store the associations is to have a table (not illustrated) in which each discussion group has associated in memory a respective subset of the merchants. In any case, at least two of the discussion groups may each be associated with a respective different set of merchants. That is, different discussion groups may have different merchants associated therewith. For example, discussion group #Shipping may be associated with Jane and Fred, but not Ted, and discussion group #NewMerchant may be associated with Ted and Jane, but not Fred. A message belonging to a discussion group is transmitted to merchant devices of the merchants associated with the discussion group. Step 554 is optional in the embodiment of FIG. 14 because the method may instead begin at a later point in time, e.g. at step 556.

The following steps are performed for a particular merchant. The particular merchant may be a particular user/person (e.g. merchant Fred) or a particular company, or a particular online store. In step 556, the processor 272 obtains an indication that the particular merchant has a particular setting in an e-commerce platform 270. For example, the processor 272 detects or obtains an indication of the presence of a particular setting or of a change to the setting value stored for the particular merchant in the e-commerce platform 270. In some embodiments, the indication may be pushed from the merchant data server 280. In some embodiments, the indication may be pulled from the merchant data server 280. The particular setting is one of a plurality of settings in the e-commerce platform. Each setting of the plurality of settings has associated therewith a respective subset of the discussion groups. One example is look-up-table 502 in FIG. 13. In look-up-table 502 in FIG. 13, there are a plurality of settings, and each setting has associated therewith a respective subset of discussion groups.

In step 558, the processor 274 selects a target discussion group that the particular merchant is not already associated with. The target discussion group is selected from the subset of the discussion groups associated with the particular setting. For example, Jane's settings in the e-commerce platform 270 indicate that Jane has a Facebook™ sales channel, e.g. as shown at 535 in FIG. 7. The setting "Facebook™ sales channel=YES" has associated therewith a subset of discussion groups including #FacebookAds and #FacebookHacks, as shown in FIG. 13. Table 322 of FIG. 5 reveals that Jane is not already associated with the discussion group #FacebookHacks. Therefore, #FacebookHacks is selected as a target discussion group for Jane.

In step 560, the processor 274 stores in the memory 276 an association between the particular merchant and the target discussion group in order to associate the particular merchant with the target discussion group. For example, table 322 may be updated to add #FacebookHacks to Jane's entry in table 322. Jane is now following the discussion group #FacebookHacks.

In some embodiments, before performing step 560, i.e. before associating the particular merchant with the target discussion group, the following steps may first be performed. A request may be transmitted over a network to a merchant device of the particular merchant. The request recommends that the particular merchant be associated with the target discussion group. A response is received over the network from the merchant device of the particular merchant. The response authorizes that the particular merchant be associated with the target discussion group. Examples are shown and described in relation to FIG. 9. The request may be a message transmitted over network 254 to merchant device 252 and displayed on the user interface of the merchant's device. The response may be generated and sent back to the communications server 272 upon the merchant selecting input object 365 or 366 in FIG. 9.

In some embodiments, the method of FIG. 14 further includes: (1) detecting or obtaining an indication that the particular merchant no longer has the particular setting stored in the e-commerce platform (e.g. because the setting value has changed); and (2) deleting from the memory the association between the particular merchant and the target discussion group and/or replacing the association with an association with another discussion group that may be more relevant or applicable. For example, if Jane changes her settings in the e-commerce platform 270 to no longer have a Facebook™ sales channel, then Jane may no longer be associated with the discussion group #FacebookHacks.

In some embodiments, prior to deleting from the memory the association between the particular merchant and the target discussion group, the following steps are performed: (1) transmitting a request over a network to a merchant device of the particular merchant, the request querying whether the particular merchant is to still be associated with the target discussion group; and (2) receiving a response over the network from the merchant device of the particular merchant, the response indicating that the particular merchant is to no longer be associated with the target discussion group. For example, a message may be transmitted to Jane's device asking whether Jane would like to be removed from the #FacebookHacks discussion group. If Jane responds "yes", then the association between Jane and #FacebookHacks is deleted from table 322. In some embodiments, the request for removing or deleting a particular discussion group may be coupled with a request for adding another discussion group which may be more applicable or relevant, such as an association which relates to a new setting value.

In some embodiments, a discussion group in the subset of discussion groups associated with the particular setting is different from another discussion group in the subset of discussion groups associated with another setting. For example, the subset of discussion groups associated with the setting "Facebook™ sales channel=YES" in FIG. 13 includes discussion group #FacebookHacks. The discussion group #FacebookHacks is different from another discussion group associated with another setting in FIG. 13. In some embodiments, a discussion group in the subset of discussion groups associated with the particular setting is different from each other discussion group in the subset of discussion groups associated with another setting, e.g. #FacebookHacks is a discussion group different from all of the discussion groups associated with the setting "Discount Applied=YES". In some embodiments, a discussion group in the subset of discussion groups associated with the particular setting is different from the discussion groups in each other subset of discussion groups associated with each other setting of the plurality of settings, e.g. #WhenToRemoveDiscount is associated with the setting "Discount Applied=YES", and #WhenToRemoveDiscount is different from any other discussion group associated with any other setting in FIG. 13.

In some embodiments, for each setting of the plurality of settings: a discussion group in the subset of discussion groups associated with the setting is different from the discussion groups in each other subset of discussion groups associated with each other setting of the plurality of settings. For example, in FIG. 13, each setting has associated therewith at least one discussion group that is only associated with that setting and not associated with any other setting.

In some embodiments, the particular setting indicates at least one of the following: a particular application installed by the particular merchant on the e-commerce platform; a particular sales channel used by the particular merchant; a particular payment method used by the particular merchant; a particular shipping service used by the particular merchant; a discount applied by the particular merchant; a particular product or product-type sold by the particular merchant; a particular collection sold by the particular merchant; a particular preference of the particular merchant on the e-commerce platform.

In some embodiments, the method of FIG. 14 further includes: (1) receiving a request over a network from a merchant device of a merchant, the request to create a new discussion group; (2) storing in the memory a new identifier for the new discussion group that uniquely identifies the new discussion group; (3) storing in the memory subsequent messages that belong to the new discussion group; and (4) associating the new discussion group with a given setting of the plurality of settings. In some embodiments, the merchant that requested to create the new discussion group has the given setting in the e-commerce platform. In some embodiments, the majority of merchants associated with the new discussion group each have the given setting in the e-commerce platform. For example, merchant Jane may decide that she wants to start a new discussion group she calls #FacebookNewbie. Jane sends a request (via her merchant device) to server 272 to create the new discussion group. The processor 274 stores the new identifier (#FacebookNewbie) for the group in discussion groups 312, along with any subsequent messages that belong to the new discussion group. The processor 274 also decides which e-commerce setting(s) to associate the new group with, and stores the association. In some embodiments, the new group may be associated with the setting "Facebook™ sales channel=YES" because Jane has this setting in the e-commerce platform 270, i.e. Jane has a Facebook™ sales channel. In some embodiments, the new group may be associated with the setting "Facebook™ sales channel=YES" because the majority of merchants associated with or participating in (e.g. posting messages in) the new discussion group each have this setting, i.e. each have a Facebook™ sales channel. The decision to associate the new discussion group with the setting "Facebook™ sales channel=YES" may be based on other or different factors instead, e.g. the use of the word "Facebook" in the title of the group and/or the number of times the word "Facebook" appears in the messages posted to the new discussion group.

In some embodiments, step 556 includes querying settings data in the e-commerce platform to obtain the indication that the particular merchant has the particular setting.

In some embodiments, the subset of discussion groups associated with a setting in an e-commerce platform may include one or more discussion groups that relate to another setting in the e-commerce platform. This may allow for a discussion group relating to one setting in the e-commerce platform to be associated with (e.g. recommended to) a merchant having another setting in the e-commerce platform. For example, a merchant may have the setting "Facebook Channel=NO". However, the merchant may benefit from having a Facebook™ sales channel. Therefore, one or more of the discussion groups related to "Facebook Channel=YES" may be associated with the "Facebook Channel=NO" setting and recommended to the merchant. The decision to make the recommendation may be based on other factors also, e.g. the similarity between merchants. For example, a first merchant having the setting "Facebook Channel=NO" may be similar to a second merchant having the setting "Facebook Channel=YES" (e.g. the first merchant and the second merchant may have something in common, such as sell the same category of products or services, and/or live in the same geographical location, etc.). A discussion group that is associated with the second merchant may be recommended to the first merchant.

Identifying Merchant Discussion Groups Based on Other Information

In some embodiments, a merchant discussion group may be identified for a merchant based on an action taken by the merchant or information input by the merchant. The action may be recorded by the e-commerce platform 270 (e.g. stored in merchant data server 280), and the indication of the action may either be pushed to the communications server 272 or periodically pulled by the communications server 272 (e.g. via periodic polling of the merchant data server 280).

Examples of actions may include fulfilling an order, hovering the mouse over a particular box on the user interface of the merchant's device, etc. Any action taken by a merchant and registered by the e-commerce platform may be used to trigger or factor into identifying a merchant discussion group. A table similar to that in FIG. 13 may be used in which each action is associated with a respective subset of discussion groups. In some embodiments, a method may include, for a particular merchant: (1) obtaining an indication that the particular merchant has taken a particular action, wherein the particular action is one of a plurality of possible actions, and wherein each action of the plurality of actions has associated therewith a respective subset of the discussion groups; (2) selecting a target discussion group that the particular merchant is not already associated with, the target discussion group being selected from the subset of the discussion groups associated with the particular action; and (3) storing in the memory an association between the particular merchant and the target discussion group in order to associate the particular merchant with the target discussion group.

In some embodiments, a merchant discussion group may only be identified for a merchant if that discussion group is trending or has recent activity.

In some embodiments, a merchant discussion group may be identified for a merchant based on another merchant discussion group the merchant is already following. For example, if merchant Jane is already following #NewMerchant, then another discussion group may be identified for merchant Jane that is trending and for which a high percentage of active participants are also part of the #NewMerchant group.

For example, merchant John is not known by Jane, but merchant John follows the #NewMerchant group. Merchant John starts a new discussion group #NewbieHacks, and that new discussion group starts trending. #NewbieHacks also has a lot of followers that are also part of the #NewMerchant group. Therefore, the #NewbieHacks discussion group may be identified for Jane, e.g. it may be recommended to Jane or automatically added to the set of discussion groups associated with Jane.

In some embodiments, a merchant discussion group may be identified for a merchant based on another merchant discussion group in which the merchant is actively participating. For example, in the example immediately above, the #NewbieHacks group may only be identified for Jane if Jane is actively participating in the #NewMerchant group, e.g. Jane recently posted a message in the #NewMerchant group. As another example, if a merchant is actively participating in the #Shipping discussion group, then if a related discussion group (e.g. #FedEx) became trending, then that discussion group may be identified for the merchant.

In some embodiments, a merchant discussion group may be identified for a merchant based on the content of messages posted by that merchant in one or more discussion groups. For example, if merchant Jane posted a message in the #NewMerchant group asking "Which shipping service is best if I have small products and low sales? Anyone happy with FedEx?", then the processor 274 may identify the word "shipping" in the posting by Jane and identify a discussion group for Jane relevant to that word, e.g. the #Shipping discussion group. The processor 274 may identify that "FedEx" is next to a "?", indicating that Jane may be interested in FedEx™, and so the processor 274 may identify a merchant discussion group relating to FedEx™, e.g. #FedEx.

In some embodiments, a merchant discussion group may be identified for a merchant based on merchant discussion groups that similar merchants are following or actively participating in. Two merchants may be categorized as "similar" if the data retrieved on each merchant in the e-commerce platform 270 indicates that the merchants are in a same category (e.g. a category of products or services of the merchant, or a merchant development phase category) or have something in common. A non-exhaustive list of examples include: both merchants are categorized as "New Merchant", and/or both merchants live in the same geographical location, and/or both merchants sell a same product, and/or both merchants have a physical store, and/or both merchants sell on Instagram™, and/or both merchants have low conversion rates, etc. For example, if merchant Fred and merchant Ted are both categorized as mature merchants, and both have one physical store, and both sell the same category of products (e.g. calendars), then both merchants may be considered similar merchants, even though Fred lives in New York and Ted lives in California. If Fred is actively participating in a particular merchant discussion group, e.g. #FiringEmployees, then this discussion group may also be identified for merchant Ted, e.g. it may be recommended to Ted or automatically added to the set of discussion groups associated with Ted.

Machine Learning Implementation

In some embodiments, the process of selecting a target discussion group for a particular merchant may involve executing a series of pre-defined rules that map certain merchant-specific data to certain outcomes. An example is the look-up-table 402 in FIG. 11 in which a merchant is mapped to a particular category using pre-programmed rules such as whether total sales are below $10,000 and whether average website visits per day are less than 20.

In some embodiments, machine learning may instead be used, e.g. for implementing functions such as categorizing a merchant and/or associating certain discussion groups with certain categories or settings, and/or selecting a target discussion group from a subset of discussion groups. The processor 274 may implement a machine learning algorithm that may use supervised or unsupervised learning. As one example, instead of a look-up-table 402 implementing the simple rules shown in FIG. 11 (i.e. instead of a rule based on whether total sales are below $10,000 and whether average views per day are less than 20), the mapping of a merchant to one of the four categories in FIG. 11 may instead be implemented using machine learning. The machine learning algorithm may categorize the merchant as either "New Merchant", "High-conversion Merchant", "Low-conversion Merchant", or "Mature Merchant" based on merchant-specific data. As another example, once the merchant has been categorized into one of the four categories in FIG. 11, a machine learning algorithm may be used to select the target discussion group from the discussion groups associated with that category, e.g. using merchant-specific data. As another example, a machine learning algorithm may be used to decide which discussion groups will be associated with each of the four categories in FIG. 11. As another example, if a merchant has a particular setting in the e-commerce platform, a machine learning algorithm may be used to select a target discussion group from the subset of discussion groups associated with that particular setting. The target discussion group may be selected by the machine learning algorithm processing merchant-specific data for the merchant. As another example, a machine learning algorithm may be used to decide which discussion groups will be associated with each setting.

Step 458 of FIG. 12 (using the data to categorize the particular merchant as belonging to a particular category of a plurality of categories), and/or step 460 of FIG. 12 (selecting a target discussion group for the merchant), and/or step 558 of FIG. 14 (selecting a target discussion group for the merchant) may be implemented using machine learning.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
    obtaining an indication that a particular merchant has taken a particular action in relation to a merchant account of the particular merchant, wherein the particular action is one of a plurality of actions that may possibly be taken by the particular merchant in relation to the merchant account, and wherein each action of the plurality of actions has associated therewith a respective subset of discussion groups;
    selecting a target discussion group that the particular merchant is not already associated with, the target discussion group being selected from the subset of the discussion groups associated with the particular action taken by the particular merchant in relation to the merchant account of the particular merchant;
    transmitting a request over a network to a merchant device of the particular merchant, the request recommending that the particular merchant be associated with the target discussion group;
    receiving a response over the network from the merchant device of the particular merchant, the response authorizing that the particular merchant be associated with the target discussion group; and
    storing in memory an association between the particular merchant and the target discussion group in order to associate the particular merchant with the target discussion group;
    wherein for each discussion group there is stored a time-ordered sequence of messages that belong to the discussion group; further wherein associations between merchants and the discussion groups are stored, wherein at least two of the discussion groups are each associated with a respective different set of merchants, and wherein a message belonging to a given discussion group is transmitted to merchant devices of the merchants associated with the given discussion group.

2. The computer-implemented method of claim 1, wherein the particular action is one of: fulfilling an order; hovering a mouse cursor over a particular user interface element; accepting a return of an item from a customer; providing a refund to the customer; participating in a particular discussion group; adding a new collection to an online store; adding a new product to the online store; or inputting particular information related to the merchant account or store of the particular merchant.

3. The computer-implemented method of claim 1, further comprising deleting from the memory the association between the particular merchant and the target discussion group, wherein prior to deleting from the memory the association between the particular merchant and the target discussion group:
    transmitting a request over the network to the merchant device of the particular merchant, the request querying whether the particular merchant is to still be associated with the target discussion group; and
    receiving a response over the network from the merchant device of the particular merchant, the response indicating that the particular merchant is to no longer be associated with the target discussion group.

4. The computer-implemented method of claim 1, wherein a discussion group in the subset of discussion groups associated with the particular action is different from another discussion group in the subset of discussion groups associated with another action.

5. The computer-implemented method of claim 4, wherein for each action of the plurality of actions: a discussion group in the subset of discussion groups associated with the action is different from the discussion groups in each other subset of discussion groups associated with each other action of the plurality of actions.

6. The computer-implemented method of claim 1, wherein information related to the plurality of the discussion groups is stored in the memory, the information including: an identifier for each discussion group that uniquely identifies the discussion group.

7. The computer-implemented method of claim 6, further comprising:
receiving a request over the network from a merchant, the request to create a new discussion group;
storing in the memory a new identifier for the new discussion group that uniquely identifies the new discussion group;
storing in the memory subsequent messages that belong to the new discussion group;
associating the new discussion group with a given action of the plurality of actions.

8. The computer-implemented method of claim 7, wherein the merchant that requested to create the new discussion group already took the given action.

9. The computer-implemented method of claim 7, wherein the majority of merchants associated with the new discussion group each have already taken the given action.

10. A system comprising:
a memory to store information related to a plurality of discussion groups;
a processor to, for a particular merchant:
obtain an indication that the particular merchant has taken a particular action in relation to a merchant account of the particular merchant, wherein the particular action is one of a plurality of actions that may possibly be taken by the particular merchant in relation to the merchant account, and wherein each action of the plurality of actions has associated therewith a respective subset of the discussion groups;
select a target discussion group that the particular merchant is not already associated with, the target discussion group being selected from the subset of the discussion groups associated with the particular action taken by the particular merchant in relation to the merchant account of the particular merchant;
generate a request for transmission over a network to a merchant device of the particular merchant, the request recommending that the particular merchant be associated with the target discussion group;
receive a response over the network from the merchant device of the particular merchant, the response authorizing that the particular merchant be associated with the target discussion group; and
store in the memory an association between the particular merchant and the target discussion group in order to associate the particular merchant with the target discussion group;
wherein for each discussion group there is stored a time-ordered sequence of messages that belong to the discussion group; further wherein associations between merchants and the discussion groups are stored, wherein at least two of the discussion groups are each associated with a respective different set of merchants, and wherein a message belonging to a given discussion group is to be transmitted to merchant devices of the merchants associated with the given discussion group.

11. The system of claim 10, wherein the processor is further to delete from the memory the association between the particular merchant and the target discussion group, and wherein prior to deleting from the memory the association between the particular merchant and the target discussion group, the processor is to:
generate a request for transmission over the network to the merchant device of the particular merchant, the request querying whether the particular merchant is to still be associated with the target discussion group; and
receive a response over the network from the merchant device of the particular merchant, the response indicating that the particular merchant is to no longer be associated with the target discussion group.

12. The system of claim 10, wherein a discussion group in the subset of discussion groups associated with the particular action is different from another discussion group in the subset of discussion groups associated with another action.

13. The system of claim 12, wherein for each action of the plurality of actions: a discussion group in the subset of discussion groups associated with the action is different from the discussion groups in each other subset of discussion groups associated with each other action of the plurality of actions.

14. The system of claim 10, wherein the particular action is one of: fulfilling an order; hovering a mouse cursor over a particular user interface element; accepting a return of an item from a customer; providing a refund to the customer; participating in a particular discussion group; adding a new collection to an online store; adding a new product to the online store; or inputting particular information related to the merchant account or store of the particular merchant.

15. The system of claim 10, wherein the information related to the plurality of discussion groups includes: an identifier for each discussion group that uniquely identifies the discussion group.

16. The system of claim 15, wherein the processor is further to:
receive a request from of a merchant, the request to create a new discussion group;
store in the memory a new identifier for the new discussion group that uniquely identifies the new discussion group;
store in the memory subsequent messages that belong to the new discussion group;
associate the new discussion group with a given action of the plurality of actions.

17. The system of claim 16, wherein the merchant that requested to create the new discussion group already took the given action.

18. The system of claim 16, wherein the majority of merchants associated with the new discussion group each have already taken the given action.

19. A non-transitory computer-readable medium having stored thereon computer-executable instructions that, when executed, cause a computer to perform operations comprising:
obtaining an indication that a particular merchant has taken a particular action in relation to a merchant account of the particular merchant, wherein the particular action is one of a plurality of actions that may possibly be taken by the particular merchant in relation to the merchant account, and wherein each action of the plurality of actions has associated therewith a respective subset of discussion groups;
selecting a target discussion group that the particular merchant is not already associated with, the target discussion group being selected from the subset of the discussion groups associated with the particular action taken by the particular merchant in relation to the merchant account of the particular merchant;

transmitting a request over a network to a merchant device of the particular merchant, the request recommending that the particular merchant be associated with the target discussion group;

receiving a response over the network from the merchant device of the particular merchant, the response authorizing that the particular merchant be associated with the target discussion group; and storing in memory an association between the particular merchant and the target discussion group in order to associate the particular merchant with the target discussion group;

wherein for each discussion group there is stored a time-ordered sequence of messages that belong to the discussion group; further wherein associations between merchants and the discussion groups are stored, wherein at least two of the discussion groups are each associated with a respective different set of merchants, and wherein a message belonging to a given discussion group is transmitted to merchant devices of the merchants associated with the given discussion group.

\* \* \* \* \*

UNITED STATES PATENT AND TRADEMARK OFFICE
CERTIFICATE OF CORRECTION

PATENT NO. : 11,677,710 B2
APPLICATION NO. : 17/479506
DATED : June 13, 2023
INVENTOR(S) : Michael Perry Page 1 of 1

It is certified that error appears in the above-identified patent and that said Letters Patent is hereby corrected as shown below:

In the Claims

At Column 40, Line 37, Claim 16: "receive a request from of a merchant" should be - receive a request from a merchant -

Signed and Sealed this
Twenty-fifth Day of July, 2023

Katherine Kelly Vidal
*Director of the United States Patent and Trademark Office*